US009264935B2

(12) United States Patent
Gu et al.

(10) Patent No.: US 9,264,935 B2
(45) Date of Patent: Feb. 16, 2016

(54) CONGESTION CONTROL METHOD AND APARATUS FOR WIRELESS NETWORKS

(75) Inventors: Xinyu Gu, Beijing (CN); Andreas Höglund, Stockholm (SE); Edgar Ramos, Espoo (FI); Zhang Zhang, Beijing (CN)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 336 days.

(21) Appl. No.: 13/615,216

(22) Filed: Sep. 13, 2012

(65) Prior Publication Data

US 2014/0071815 A1     Mar. 13, 2014

(51) Int. Cl.
| | |
|---|---|
| *H04L 1/00* | (2006.01) |
| *H04W 28/02* | (2009.01) |
| *H04W 52/34* | (2009.01) |
| *H04W 52/36* | (2009.01) |
| *H04W 52/14* | (2009.01) |

(52) U.S. Cl.
CPC ........ *H04W 28/0289* (2013.01); *H04W 52/343* (2013.01); *H04W 52/346* (2013.01); *H04W 52/367* (2013.01); *H04W 52/146* (2013.01); *Y02B 60/50* (2013.01)

(58) Field of Classification Search
CPC . H04W 52/343; H04W 52/34; H04W 52/346; H04W 52/146; H04W 28/0289; H04W 52/367; Y02B 60/50
USPC .......................... 370/235, 252, 329, 343, 229; 455/422.1, 522
See application file for complete search history.

(56) References Cited

U.S. PATENT DOCUMENTS

| | | | |
|---|---|---|---|
| 7,724,656 B2 | 5/2010 | Sagfors et al. | |
| 7,801,102 B2 * | 9/2010 | Duan ............................ | 370/342 |
| 7,925,271 B2 * | 4/2011 | Ranta-Aho et al. ........... | 455/453 |
| 8,098,581 B2 * | 1/2012 | Tiedemann et al. .......... | 370/235 |

(Continued)

FOREIGN PATENT DOCUMENTS

| | | |
|---|---|---|
| EP | 1 724 978 A2 | 11/2006 |
| WO | WO 01/80575 A2 | 10/2001 |

(Continued)

OTHER PUBLICATIONS

Written Opinion issued in International Application No. PCT/SE2012/051010 dated Sep. 25, 2013.

(Continued)

*Primary Examiner* — Kwang B Yao
*Assistant Examiner* — Harun Chowdhury
(74) *Attorney, Agent, or Firm* — Baker Botts, LLP

(57) ABSTRACT

A wireless terminal comprises a communications interface and a congestion controller. The communications interface communicates over a radio interface with a base station. The congestion controller, upon occurrence of a congestion indication, reduces uplink transmission power of the wireless terminal by lowering a transport format combination for use by the wireless terminal for transmitting an enhanced dedicated uplink channel (E-DCH) over the radio interface to the base station. In an example embodiment and mode, the congestion controller performs an expedited transport format combination reduction procedure which is distinct from Dedicated Physical Control Channel (DPCCH) power reduction based on a command received in a closed loop power control procedure, e.g., on a Fractional-DPCH (F-DPCH) channel.

16 Claims, 9 Drawing Sheets

(56) References Cited

U.S. PATENT DOCUMENTS

| | | |
|---|---|---|
| 8,254,977 B2 * | 8/2012 | Fernandez-Corbaton et al. .............................. 455/522 |
| 2003/0003921 A1 | 1/2003 | Laakso |
| 2006/0105798 A1 * | 5/2006 | Ghosh ................... H04W 52/12 455/522 |
| 2006/0159016 A1 | 7/2006 | Sagfors et al. |
| 2006/0268789 A1 | 11/2006 | Yu et al. |
| 2010/0232293 A1 | 9/2010 | Sagfors et al. |
| 2011/0171991 A1 | 7/2011 | Liu et al. |
| 2011/0223900 A1 * | 9/2011 | Yu ......................... H04W 72/08 455/422.1 |
| 2012/0157007 A1 * | 6/2012 | Yoneyama et al. ........ 455/67.14 |
| 2012/0201157 A1 * | 8/2012 | Levy et al. ................... 370/252 |

FOREIGN PATENT DOCUMENTS

| | | |
|---|---|---|
| WO | WO 2006/075951 A1 | 7/2006 |
| WO | WO 2010/033066 A1 | 3/2010 |

OTHER PUBLICATIONS

International Search Report issued in International Application No. PCT/SE2012/051010 dated Sep. 25, 2013.

Liu Jinhua, "Fast Congestion Control in EUL," EAB-10:000177, Feb. 8, 2010.

Liu Jinhua, et al., "BLER Based Load Control Improvement," Jul. 8, 2011.

3GPP TS 25.321, "$3^{rd}$ Generation Partnership Project; Technical Specification Group Radio Access Network; Medium Access Control (MAC) Protocol Specification (Release 11)," V11.0.0, Dec. 2011.

* cited by examiner

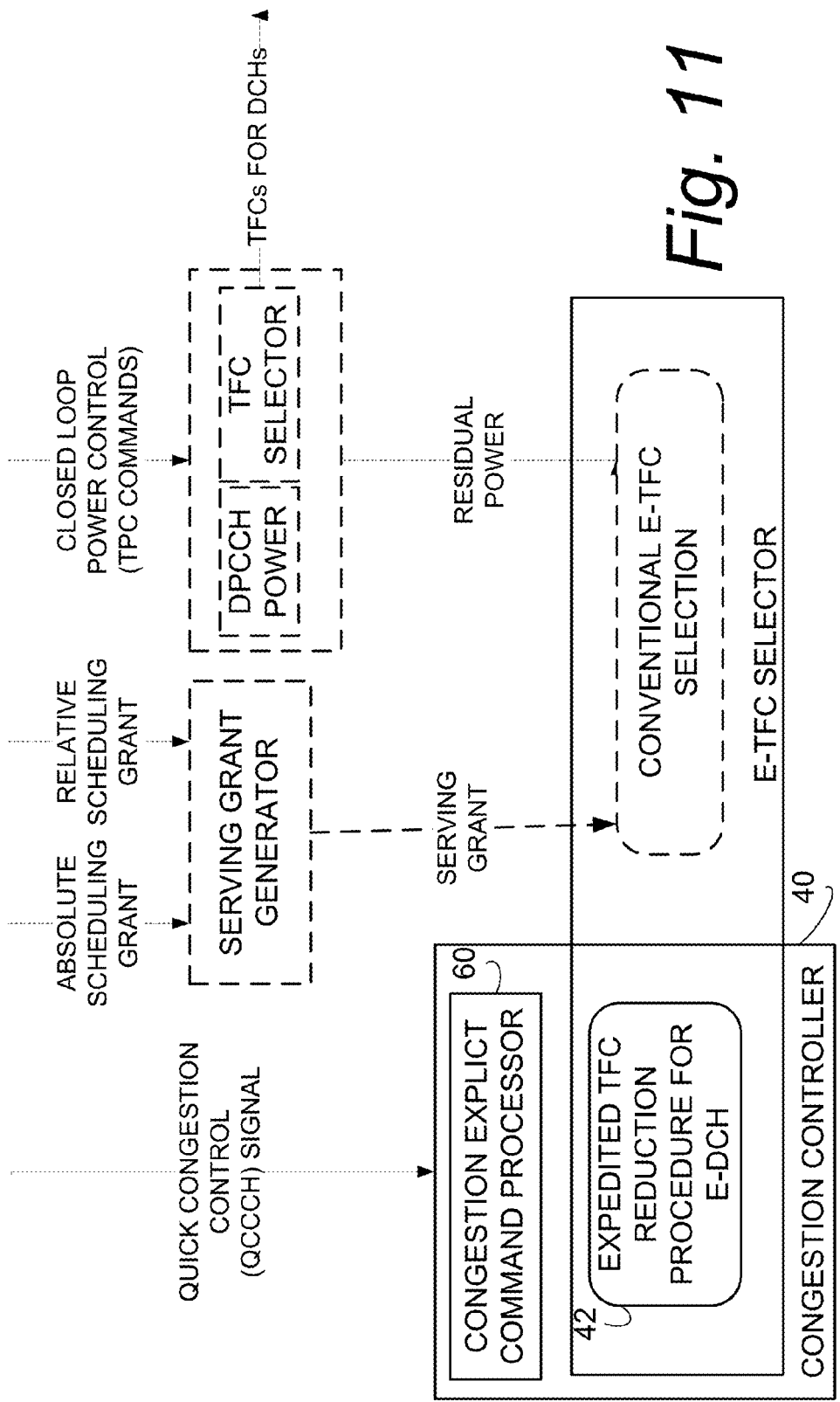

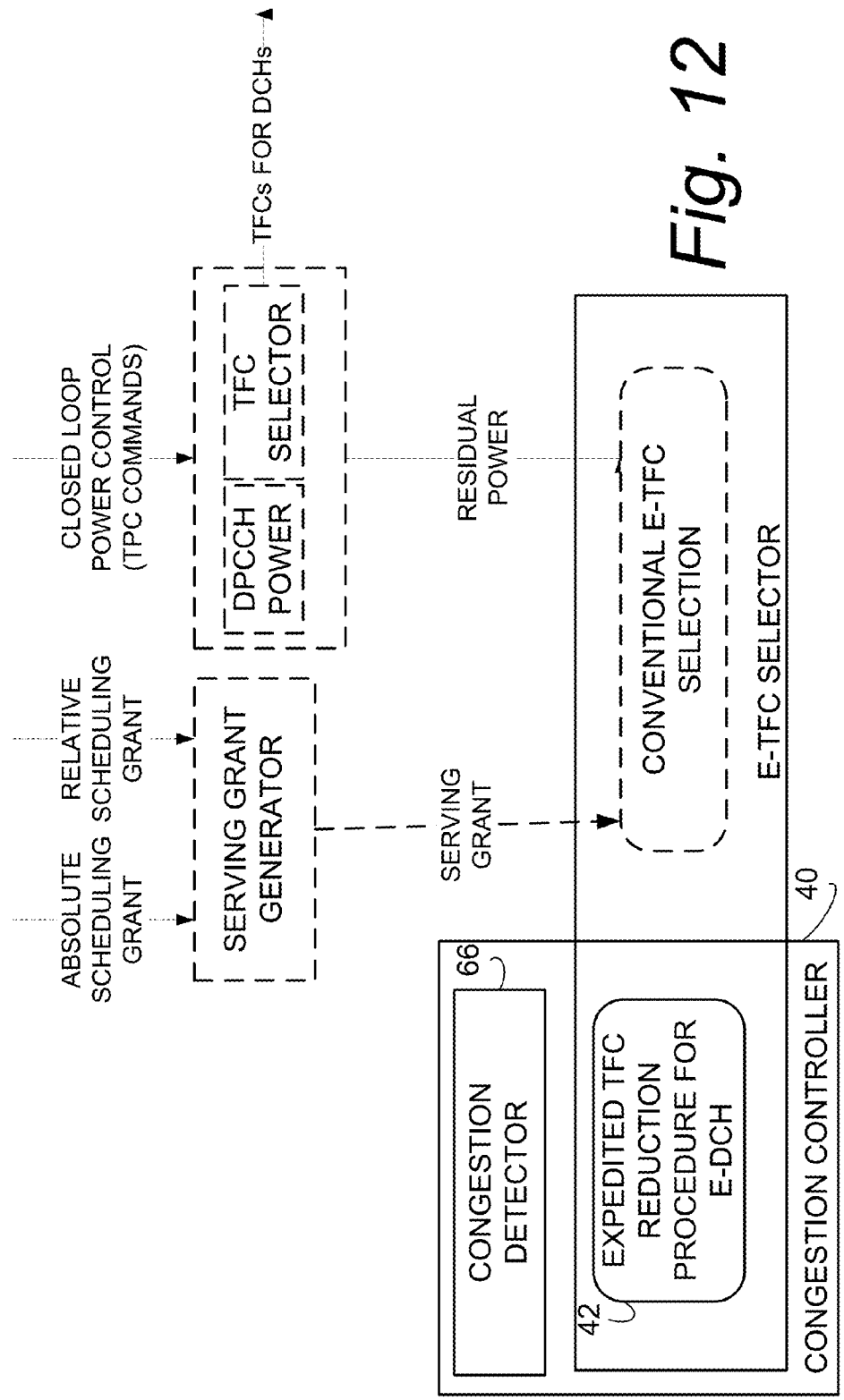

CONGESTION CONTROL METHOD AND APARATUS FOR WIRELESS NETWORKS

TECHNICAL FIELD

The technology relates to controlling congestion in wireless networks, and particularly to controlling congestion on an uplink in a radio access network.

BACKGROUND

In a typical cellular radio system, wireless terminals (also known as mobile stations and/or user equipment units (UEs)) communicate via a radio access network (RAN) to one or more core networks. The radio access network (RAN) covers a geographical area which is divided into cell areas, with each cell area being served by a base station, e.g., a radio base station (RBS), which in some networks may also be called, for example, a "NodeB" (UMTS) or "eNodeB" (LTE). A cell is a geographical area where radio coverage is provided by the radio base station equipment at a base station site. Each cell is identified by an identity within the local radio area, which is broadcast in the cell. The base stations communicate over the air interface operating on radio frequencies with the user equipment units (UE) within range of the base stations.

In some versions of the radio access network, several base stations are typically connected (e.g., by landlines or microwave) to a controller node (such as a radio network controller (RNC) or a base station controller (BSC)) which supervises and coordinates various activities of the plural base stations connected thereto. The radio network controllers are typically connected to one or more core networks.

The Universal Mobile Telecommunications System (UMTS) is a third generation mobile communication system, which evolved from the second generation (2G) Global System for Mobile Communications (GSM). UTRAN is essentially a radio access network using wideband code division multiple access for user equipment units (UEs). In a forum known as the Third Generation Partnership Project (3GPP), telecommunications suppliers propose and agree upon standards for third generation networks and UTRAN specifically, and investigate enhanced data rate and radio capacity.

High-Speed Uplink Packet Access (HSUPA) is a 3G mobile telephony protocol, also known as Enhanced Uplink (EUL). The specifications for HSUPA are included in Universal Mobile Telecommunications System Release 6 standard published by 3GPP. The technical purpose of the Enhanced Uplink is to improve the performance of uplink dedicated transport channels, e.g., to increase capacity and throughput and reduce delay. HSUPA uses an uplink enhanced dedicated channel (E-DCH) on which it employs link adaptation methods similar to those employed by High-Speed Downlink Packet Access (HSDPA). HSUPA, among other technologies, is discussed in Dahlman, Erik, et al, 3G Evolution: HSPA and LTE for Mobile Broadband, Academic Press, 2008, ISBN: 978-0-12-374538-5, which is incorporated herein by reference in its entirety.

HSUPA uses a packet scheduler which is located in the NodeB. The scheduler forms part of a unit known as a NodeB MAC-e, which unit is responsible for support of fast hybrid ARQ transmissions and scheduling. The UE also has a MAC-e unit; the UE MAC-e unit is responsible for selecting the data rate within limits set by the scheduler in the NodeB MAC-e.

HSUPA operates on a request-grant principle according to which the UEs request permission to send data and the scheduler in the NodeB decides when and how many UEs will be allowed to do so. That is, the scheduler in the NodeB receives scheduling requests from the UE when the UE desires to transmit at a higher data rate than currently allowed. A request for transmission from the UE contains data about the state of the transmission buffer in the UE and the queue at the UE, and the UE's available power margin. The NodeB for the serving cell then makes a scheduling decision and, if the decision is favorable, responds with a scheduling grant.

At the Physical Layer, HSUPA introduces new channels E-AGCH (Absolute Grant Channel), E-RGCH (Relative Grant Channel), F-DPCH (Fractional-DPCH), E-HICH (E-DCH Hybrid ARQ Indicator Channel), E-DPCCH (E-DCH Dedicated Physical Control Channel) and E-DPDCH (E-DCH Dedicated Physical Data Channel). E-DPDCH is used to carry the E-DCH Transport Channel. That is, the E-DCH is mapped to a set of channelization codes known as E-DCH Dedicated Physical Data Channels (E-DPDCHs). Depending on the instantaneous data rate, the number of E-DPDCHs and their spreading factors are both varied. The E-DPCCH is used to carry the control information associated with the E-DCH.

As mentioned above, for Enhanced Uplink the scheduler is located in the NodeB, and the NodeB scheduler controls when and at what rate a UE is allowed to transmit, thereby controlling the amount of interference affecting other users at the NodeB. This can be seen as controlling each UE's consumption of common radio resources, which in the case of Enhanced Uplink is the amount of tolerable interference. In the uplink, the total amount of tolerable interference is defined as the average interference over all the RX antennas. The amount of common uplink resources a terminal is using depends on the data rate used. Generally, the higher the data rate, the larger the required transmission power and thus the higher resource consumption.

A relative measure of total interference is Rise over Thermal (RoT), i.e. total interference relative to thermal noise. The term "noise rise" or "rise-over-thermal" is often used when discussing uplink operation. Noise rise, defined as $(I+N0)/N0$ where $N0$ and $I$ are the noise and wideband interference, respectively, is a measure of the increase in interference in the cell due to transmission activity. The uplink scheduler in the NodeB needs to keep the noise rise within acceptable limits.

Uplink load control adjusts the load headroom for a cell so that the measured RoT is controlled towards a target RoT. In uplink transmissions an inner loop power control (ILPC) (e.g., "inner control loop") enables the UE to adjust its output power in accordance with one or more TPC (transmit power control) commands received in the downlink. The target RoT is determined primarily by factors such as network dimensioning for coverage considerations. The TPC (transmit power control) commands are issued by the aforementioned NodeB for maintaining quality of control channel DPCCH. While the power control and scheduler are different functions of the eNodeB, there is some interaction between power control and load control/scheduling.

The uplink scheduler in the NodeB allocates the available UL load to the scheduled users who require higher uplink bit-rate and reduces the granted uplink bit-rate of some scheduled users when the system is overloaded, e.g., when there is a RoT peak. However, due to the large time delay in uplink load control and scheduler, large RoT oscillation can occur, either above or below than the RoT target, and the RoT peak can last a long time before the RoT is reduced to an acceptable level. Such time delay may be occasioned by numerous factors, including RoT measurement delay; Node B processing delay; and grant transmission and processing delay, etc.

A "load factor" represents the portion of uplink interference that a certain channel of a certain user terminal generates, which is defined as the interference due to the channel of that user terminal divided by the total interference. The total load factor of different channels is equal to the sum of load factors of the different channels. Uplink load estimation estimates the load that has been or will be generated in each cell from different channels. Power based load estimation means load estimation according to the load factor definition as described above. A benefit of power based load estimation is that it is receiver independent and can naturally capture the receiver gain of various types of receivers.

In order to reduce the RoT peak levels and suppress the RoT peaks quickly, Fast Congestion Control (FCC) has been proposed. For example, in WO/2001/080575, entitled "CELLULAR COMMUNICATIONS SYSTEM/METHOD WITH UPLINK INTERFERENCE CEILING; and US Patent Publication 2003/0003921 A1, entitled "Method for Traffic Load Control in a Telecommunication Network", both incorporated herein by reference in their entireties, it is proposed that TPC down commands are sent to selected users when the measured RoT exceeds the target level. For a selected UE, the Fast Congestion Control (FCC) procedure is executed as follows: (1) if the TPC generated by the inner loop power control (ILPC) is TPC DOWN command, the same TPC DOWN command is sent to the UE without changes; (2) if the TPC generated by the inner loop power control is TPC UP command, FCC changes the TPC command from UP to DOWN and this TPC DOWN command is sent to the UE. This is referred to hereinafter as the "forced TPC down command".

As Fast Congestion Control (FCC) reacts much faster than the uplink load control and the scheduler, RoT can be better controlled and uplink load can be more efficiently utilized. Therefore, Fast Congestion Control (FCC) can be a low cost implementation for considerable gain in the future.

A drawback of Fast Congestion Control (FCC) is that the block error rate (BLER) of the users targeted by FCC will increase substantially. This may cause problem especially for users with relatively high QoS requirement.

With interference cancellation (IC) the signal to noise interference ratio (SINR) can be significantly improved, and thus also an evident improvement in data rate. Both E-DPDCH and DPCCH can benefit from interference cancellation (IC), but it is important to realize the first initial channel estimate based on only DPCCH must be good enough to start the whole interference cancellation (IC) process, and that channel estimate is before any IC. Thus, the DPCCH quality must be good enough and a bad DPCCH quality can negatively impact the benefit we can get from interference cancellation (IC).

During data transmission in general, a receiver needs to know what type of Transport Format (TF) is valid for each transport channel, e.g., the number of bits that will be transmitted on the transport channel during a transmission time interval (TTI). A transport channel may have several different possible transport formats, which each transport format having a different Transport Format Identifier (TFI). A dynamic part of the Transport Format defines the Transport Block Size and a Transport Block Set Size (how many Transport Blocks can be delivered in on TTI); a static part of the Transport Format defines such parameters as the TTI, coding type and size; size of CRC, etc. Given the fact that plural transport channels may be used at one time, a parameter known as the Transport Format Combination (TFC) is used to express the TFIs for the plural channels. For example, the Transport Format Combination (TFC) provides information on how many bits (Transport Blocks) of each transport channel are transmitted in the next TTI.

For the Enhanced Uplink and its E-DCH, the possible E-TFCs, i.e., the possible transport block sizes, are predefined in the specifications similar to HS-DSCH. At connection setup, a set of up to eight reference E-TFCs (Enhanced Transport Format Combinations), their transport block size and quantization amplitude ratios, are signaled to the UE. Then, during an HSUPA connection, the UE can calculate the needed transmission power for each E-TFC based on the referenced E-TFCs and its quantized power ratio. At each TTI boundary, the UE determines the state of each E-TFC based on the E-TFC's required transmit power versus the maximum allowed UE transmit power. Once the E-TFC is selected along with all of the signaled parameters, the uplink is completely configured and the data rate for the next transmission is known.

As mentioned above, the NodeB scheduler sends scheduling grants to the UE. A scheduling grant includes an index value, with the index value sent in the scheduling grant being one of several possible index values stored in a table, each stored index value in turn being matched or paired with an associated power offset. Each power offset stored in the table is an indication of how much power relative to power of the DPCCH the wireless terminal is allowed to use for transmission of the E-DCH when the associated index is received in the scheduling grant. The grants may be either absolute grants or relative grants. Absolute grants, sent on the AGCH, provide an absolute limitation of the maximum amount of uplink power resources that the UE may use. The grants also inherently limit the uplink resources since there is a relation between the E-TFC, the number of codes, spreading factor, and modulation that the wireless terminal may use. Absolute grants are sent to the UE usually at the start of a HSUPA connection. The absolute grant value indicates the maximum E-DCH traffic to pilot power ratio (E-DPDCH/DPCCH) that the UE is allowed to use in the next transmission. Relative grants, sent on the E-RGCH, increase or decrease the power compared to the previously used to value. The relative grants can be sent every scheduling period, on a dedicated channel. Relative grants typically change the E-DPDCH power in small amounts relative to the previous value. The UE uses the information in the absolute and relative grants to calculate its "serving grant". This is serving grant is updated in accordance with the scheduling period. The serving grant permits the UE to calculate its maximum power to use to transmit data on the E-DPDCH(s). The UE has been informed at connection set up how much power is needed to use each physical channel combination, so the UE knows what is the maximum block size it can transmit for each TTI.

The power needed for an E-DCH transmission is calculated from two power offsets relative to the power for the DPCCH. One power offset is associated with each E-TFC and one power offset is associated with the hybrid ARQ profile. The resulting transmitter power is then calculated by adding these two power offsets to the DPCCH power. When the required transmitter power for different E-TFCs has been calculated, the UE can calculate which E-TFCs are possible to use from a power perspective. The UE then selects the E-TFC by maximizing the amount of data that can be transmitted given the power constraint and the scheduling grant.

Usually the maximum allowed power of a UE is determined by the maximum transmission power of a UE, for example 20 dBm, and power back off requirements, for example power back off for higher order modulation to reduce the PAPR (Peak to Average Power Ratio).

As stated above, the maximum allowed power is one of the limiting factors when the UE decides its transport format. The other two limiting factors are available data in the UE buffer and the scheduling grant set by the Node B. If UE is power limited, which means the power limit is the tightest limitation among all the limiting factors, the E-TFC selection in power limited scenario is illustrated in FIG. 1A. FIG. 1B, on the other hand, illustrates an example E-TFC selection in a non-power-limited scenario. The UE can check if it is in a power limited scenario by comparing selected E-TFC using power limit and E-TFCs selected according to the grant limit and data buffer limit.

PCT/CN2011/001888, which concerns BLER Based Load Control Improvement and which is incorporated herein by reference, proposes a method wherein Block Error Rate (BLER) statistics are fed into the load control/scheduler so that the uplink radio resource utilization is enhanced by more aggressive utilization of Fast Congestion Control (FCC) while the BLER of the served EUL users is controlled within a predefined acceptable range by adjusting the load headroom/granted power offset accordingly.

With Fast Congestion Control (FCC), the DPCCH power is reduced by the inner loop power control (ILPC) in order to mitigate the RoT rush. However, there is a tradeoff between the better controlled RoT and the increased retransmission rate. With an aggressive Fast Congestion Control (FCC) algorithm, the uplink load can be well controlled, but there can be a very high retransmission rate due to the low DPCCH power which is not desirable especially for users with delay sensitive traffic.

This problem is more critical with power-based load estimation, since a decreased DPCCH power by Fast Congestion Control (FCC) will lead to a lower estimated DPCCH load, and consequently a higher granted power offset, which in turn leads to even higher BLER and consequently even higher retransmission rate. In other words, Fast Congestion Control (FCC) cannot be set too aggressively and some load margin still needs to be reserved especially with power based load estimation. Besides, as described above, a bad DPCCH quality can negatively impact the benefits obtained from interference cancellation (IC).

A proposed solution tends to retrieve the E-TFC grant when high block error rate is observed. However, there is considerable delay from when a new grant is scheduled to the new grant takes effect. Because of the long delay the negative effect due to interaction between FCC and power based load estimation cannot be effectively mitigated, and the negative impact on interference cancellation (IC) may still exist. For this and other reasons, Fast Congestion Control (FCC) may not be utilized too aggressively and some load margin still needs to be reserved. Moreover, the scarce downlink code resource also makes it is difficult to retrieve the grants of many users.

SUMMARY

In one of its aspects, the technology disclosed herein concerns a wireless terminal which comprises a communications interface and a congestion controller. The communications interface is configured to communicate over a radio interface with a base station. The congestion controller is configured, upon occurrence of a congestion indication, to reduce uplink transmission power of the wireless terminal by lowering a transport format combination for use by the wireless terminal for transmitting an enhanced dedicated uplink channel (E-DCH) over the radio interface to the base station. In an example embodiment and mode, the congestion controller is configured, upon occurrence of the congestion indication, to perform an expedited transport format combination reduction procedure which is distinct from Dedicated Physical Control Channel (DPCCH) power reduction based on a command received on e.g. Fractional-DPCH (F-DPCH) channel. In an example embodiment and mode, the congestion controller is configured to perform the expedited transport format combination reduction procedure upon receiving an explicit command over the radio interface, the explicit command being distinct from a Dedicated Physical Control Channel (DPCCH) power reduction command.

In an example embodiment and mode, the congestion controller is configured to perform the expedited transport format combination reduction procedure upon receiving the explicit command included in a quick congestion control channel which is allocated upon determination of an occurrence of congestion.

In an example embodiment and mode, the congestion indication comprises a signal received by the wireless terminal from the base station, with the signal comprising an explicit command for the wireless terminal to lower the transport format combination. The explicit command to reduce the transport format combination may be formatted in a relative format.

In an example embodiment and mode, an explicit command formatted in a relative format may comprise an indication of a number of steps by which the wireless terminal is to lower a previous transport format combination to obtain an updated transport format combination for transmitting the enhanced dedicated uplink channel (E-DCH) over the radio interface to the base station.

In another example implementation, the congestion controller is configured, upon receipt of the explicit command, to lower a previous transport format combination by a predetermined number of steps to obtain an updated transport format combination for transmitting the enhanced dedicated uplink channel (E-DCH) over the radio interface to the base station. The specified number of steps may be preconfigured or signaled to the wireless terminal by the network.

In an example embodiment and mode, the congestion controller is configured to receive the signal as a broadcast signal which has been broadcast to plural wireless terminals.

In an example embodiment and mode, the congestion controller is configured to receive the signal as an addressed signal which has been uniquely addressed to the wireless terminal.

In an example embodiment and mode, the congestion indication comprises either (1) a predetermined number of transmit power control (TPC) DOWN commands received in a given time period or (2) a predetermined pattern of transmit power control (TPC) DOWN commands.

In an example embodiment and mode, the congestion indication comprises one or more signals received by the wireless terminal over the radio interface, and the congestion controller is configured to discern from the one or more signals an abnormal situation that gives rise to the congestion indication. For example, in an example embodiment and mode the abnormal situation comprises a predetermined retransmission rate and receipt of a transmit power control (TPC) DOWN command.

In an example embodiment and mode, the congestion controller is configured to determine an updated transport format combination by selecting an updated transport format combination which maximizes E-DCH power and also fulfills a condition that total required power for the uplink is lower than a specified maximum allowed uplink transmission power. For example, the congestion controller may be configured to determine the specified maximum allowed uplink transmission power by subtracting a power decrease value from an old uplink transmission power limit. The power decrease value may be determined by accumulating plural total power control commands over a transport format combination selection interval. The power decrease value may also be received in a signal from the base station. In an example implementation, the congestion controller is further configured to scale Dedicated Physical Control Channel (DPCCH) power.

In an example embodiment and mode, the congestion controller is configured to determine an updated transport format combination by: subtracting a requested uplink transmission power reduction value from a power value afforded a previous transport format combination to obtain a power limit for a new transport format combination; and, using the new power limit to determine the new transport format combination.

The power decrease value may be determined by accumulating plural total power control commands over a transport format combination selection interval. Alternatively or additionally, the power decrease value may be received in a signal from the base station.

In another of its aspects the technology disclosed herein concerns a method of operating a wireless terminal. The method comprises: obtaining a congestion indication over a radio interface with a base station; and, in response to the congestion indication, reducing uplink transmission power of the wireless terminal by lowering a transport format combination for use by the wireless terminal for transmitting an enhanced dedicated uplink channel (E-DCH) over the radio interface to the base station. In an example embodiment and mode, the method further comprises lowering the transport format combination by performing an expedited transport format combination reduction procedure which is distinct from Dedicated Physical Control Channel (DPCCH) power reduction based on a command received on e.g. Fractional-DPCH (F-DPCH) channel. The expedited transport format combination reduction procedure may be performed upon receiving an explicit command over the radio interface, the explicit command being distinct from a Dedicated Physical Control Channel (DPCCH) power reduction command.

In an example mode the method further comprises obtaining the congestion indication through a signal received by the wireless terminal from the base station, the signal comprising an explicit command for the wireless terminal to lower the transport format combination. The explicit command to reduce the transport format combination may be formatted in a relative format.

In an example mode an explicit command formatted in a relative format may comprises an indication of a number of steps by which the wireless terminal is to lower a previous transport format combination to obtain an updated transport format combination for transmitting the enhanced dedicated uplink channel (E-DCH) over the radio interface to the base station.

In an example mode the method further comprises, upon obtaining the congestion indication, lowering a previous transport format combination by a predetermined number of steps to obtain an updated transport format combination for transmitting the enhanced dedicated uplink channel (E-DCH) over the radio interface to the base station. The specified number of steps may be preconfigured or to signaled to the wireless terminal by the network.

In an example mode the congestion indication comprises either (1) a predetermined number of transmit power control (TPC) DOWN commands received in a given time period or (2) a predetermined pattern of transmit power control (TPC) DOWN commands.

In an example mode the congestion indication comprises one or more signals received by the wireless terminal over the radio interface, and the method further comprises the wireless terminal discerning from the one or more signals an abnormal situation that gives rise to the congestion indication. In an example mode the abnormal situation comprises a predetermined retransmission rate and receipt of a transmit power control (TPC) DOWN command.

In an example mode the method further comprises determining an updated transport format combination by selecting an updated transport format combination which maximizes E-DCH power and also fulfills a condition that total required power for the uplink is lower than a specified maximum allowed uplink transmission power.

In an example mode the method further comprises determining the specified maximum allowed uplink transmission power by subtracting a power decrease value from an old uplink transmission power limit.

In an example mode the method further comprises determining the power decrease value by accumulating plural total power control commands over a transport format combination selection interval.

In an example mode the method further comprises scaling Dedicated Physical Control Channel (DPCCH) power.

In an example mode the method further comprises receiving the power decrease value in a signal from the base station.

In an example mode the method further comprises determining an updated transport format combination by: (1) subtracting a requested uplink transmission power reduction value from a power value afforded a previous transport format combination to obtain a power limit for a new transport format combination; and (2) using the new power limit to determine the new transport format combination.

In an example mode the method further comprises determining the power decrease value by accumulating plural total power control commands over a transport format combination selection interval.

In an example mode the method further comprises receiving the power decrease value in a signal from the base station.

In another of its aspects the technology disclosed herein concerns a base station node. The base station comprises a communications interface and a congestion controller. The communications interface is configured to communicate over a radio interface with plural wireless terminals including a selected wireless terminal. The congestion controller is configured to reduce uplink transmission power of at least the selected wireless terminal by sending over the radio interface a signal comprising an explicit command to lower transport format combination for use by the wireless terminal for transmitting an enhanced dedicated uplink channel (E-DCH) over the radio interface to the base station. In an example embodiment and mode, the signal is configured to command the wireless terminal to perform an expedited transport format combination reduction procedure which is distinct from Dedicated Physical Control Channel (DPCCH) power reduction based on another command sent to the wireless terminal on, e.g., the Fractional-DPCH (F-DPCH) channel.

In an example embodiment and mode, the explicit command is included in a quick congestion control channel which is allocated upon determination of an occurrence of congestion.

In an example embodiment and mode, an explicit command formatted in a relative format may comprise an indication of a number of steps by which the wireless terminal is to lower a previous transport format combination to obtain an updated transport format combination for transmitting the enhanced dedicated uplink channel (E-DCH) over the radio interface to the base station.

In another of its aspects the technology disclosed herein concerns a method of operating a base station. The method comprises determining uplink congestion on a radio interface with plural wireless terminals including a selected wireless terminal; and, reducing uplink transmission power of at least the selected wireless terminal by sending over the radio interface a signal comprising an explicit command to lower transport format combination for use by the selected wireless terminal for transmitting an enhanced dedicated uplink channel (E-DCH) over the radio interface to the base station.

BRIEF DESCRIPTION OF THE DRAWINGS

The foregoing and other objects, features, and advantages of the technology disclosed herein will be apparent from the following more particular description of preferred embodiments as illustrated in the accompanying drawings in which reference characters refer to the same parts throughout the various views. The drawings are not necessarily to scale, emphasis instead being placed upon illustrating the principles of the technology disclosed herein.

FIG. 11 is a diagrammatic view illustrating an expedited TFC reduction procedure for E-DCH using the explicit command sub-mode in the context of a conventional E-TFC selection scheme.

FIG. 12 is a diagrammatic view illustrating an expedited TFC reduction procedure for E-DCH using the terminal congestion detection mode in the context of a conventional E-TFC selection scheme.

DETAILED DESCRIPTION

Figures 1A, 1B:
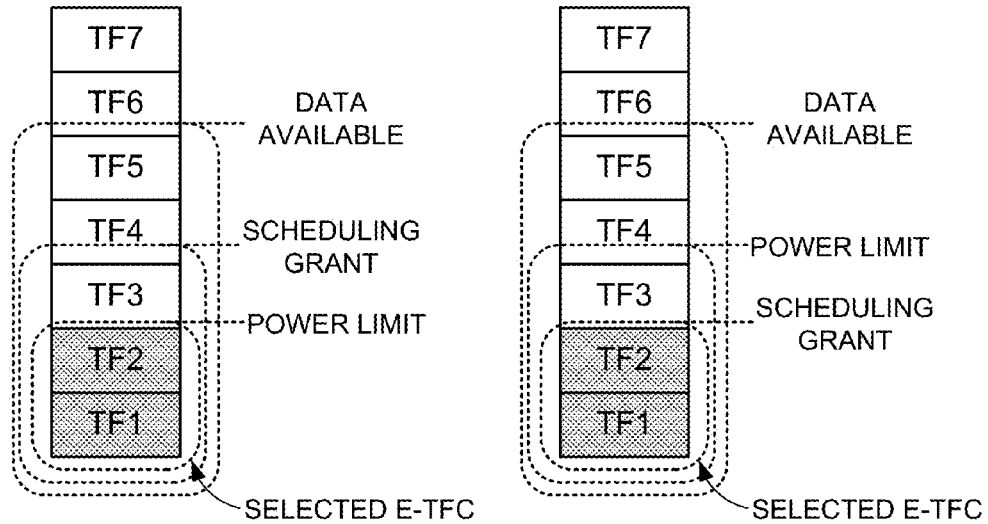
FIG. 1A is a diagrammatic view depicting E-TFC selection in a power limited scenario.
FIG. 1B is a diagrammatic view depicting an example E-TFC selection in a non-power-limited scenario.

In the following description, for purposes of explanation and not limitation, specific details are set forth such as particular architectures, interfaces, techniques, etc. in order to provide a thorough understanding of the technology disclosed herein. However, it will be apparent to those skilled in the art that the technology disclosed herein may be practiced in other embodiments that depart from these specific details. That is, those skilled in the art will be able to devise various arrangements which, although not explicitly described or shown herein, embody the principles of the technology disclosed herein and are included within its spirit and scope. In some instances, detailed descriptions of well-known devices, circuits, and methods are omitted so as not to obscure the description of the technology disclosed herein with unnecessary detail. All statements herein reciting principles, aspects, and embodiments of the technology disclosed herein, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that block diagrams herein can represent conceptual views of illustrative circuitry or other functional units embodying the principles of the technology. Similarly, it will be appreciated that any flow charts, state transition diagrams, pseudocode, and the like represent various processes which may be substantially represented in computer readable medium and so executed by a computer or processor, whether or not such computer or processor is explicitly shown.

The functions of the various elements including functional blocks, including but not limited to those labeled or described as "computer", "processor" or "controller", may be provided through the use of hardware such as circuit hardware and/or hardware capable of executing software in the form of coded instructions stored on computer readable medium. Thus, such functions and illustrated functional blocks are to be understood as being either hardware-implemented and/or computer-implemented, and thus machine-implemented.

In terms of hardware implementation, the functional blocks may include or encompass, without limitation, digital signal processor (DSP) hardware, reduced instruction set processor, hardware (e.g., digital or analog) circuitry including but not limited to application specific integrated circuit(s) [ASIC], and/or field programmable gate array(s) (FPGA(s)), and (where appropriate) state machines capable of performing such functions.

In terms of computer implementation, a computer is generally understood to comprise one or more processors or one or more controllers, and the terms computer and processor and controller may be employed interchangeably herein. When provided by a computer or processor or controller, the functions may be provided by a single dedicated computer or processor or controller, by a single shared computer or processor or controller, or by a plurality of individual computers or processors or controllers, some of which may be shared or distributed. Moreover, use of the term "processor" or "controller" shall also be construed to refer to other hardware capable of performing such functions and/or executing software, such as the example hardware recited above.

The following terminologies may be used in the disclosure for consistency and simplicity. The technology described herein may apply to a heterogeneous network comprising network As used herein, the term "node" may encompass nodes using any technology including, e.g., high speed packet access (HSPA), long term evolution (LTE), code division multiple access (CDMA) 2000, GSM, etc. or a mixture of technologies such as with a multi-standard radio (MSR) node (e.g., LTE/HSPA, GSM/HS/LTE, CDMA2000/LTE etc). Furthermore the technology described herein may apply to different types of nodes e.g., base station, eNode B, Node B, relay, base transceiver station (BTS), donor node serving a relay node (e.g., donor base station, donor Node B, donor eNB), supporting one or more radio access technologies.

Nodes that communicate using the air interface also have suitable radio communications circuitry. Moreover, the technology can additionally be considered to be embodied entirely within any form of computer-readable memory, such as solid-state memory, magnetic disk, or optical disk containing an appropriate set of computer instructions that would cause a processor to carry out the techniques described herein.

In general, in various example embodiments and modes the technology disclosed herein reduces the transmission power of a wireless terminal (UE) by selecting a lower E-TFC quickly upon detection of congestion (e.g., in the case of fast congestion control) instead of only decreasing the transmission power of DPCCH. The network can indicate to wireless terminal the quick congestion control action directly via explicit signaling (e.g., an explicit command) or the wireless terminal can detect the congestion control action of the NodeB from existing signaling. Since the technology disclosed herein enables the wireless terminal to perform E-TFC selection fairly fast (e.g., every 2 ms) with small delay, excessive DPCCH quality drop and the relevant drawbacks can be avoided. Furthermore, by taking the traffic characteristics into account, the wireless terminal has the freedom to either reduce the DPCCH power and accept a higher retransmission rate or keep the DPCCH quality and retransmission rate but decrease the transport format.

Figure 2:
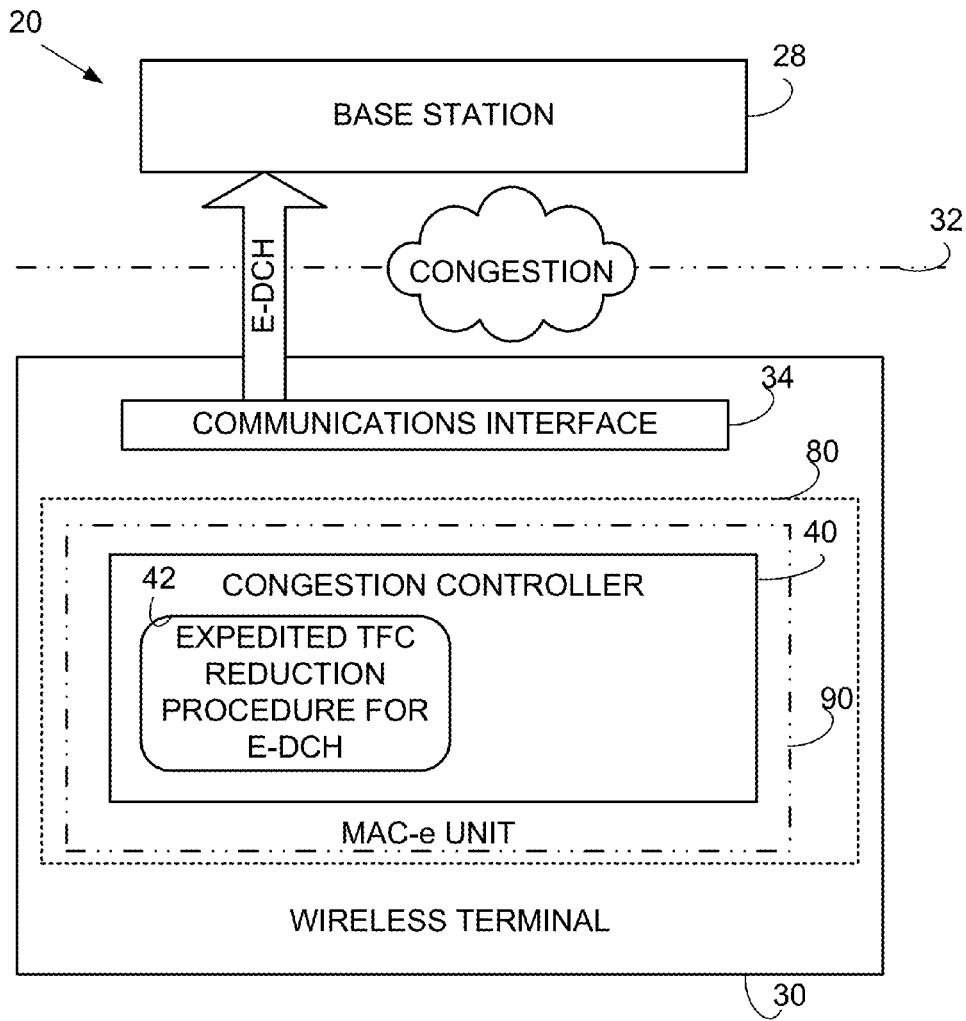
FIG. 2 is a schematic view of an example communications network according to an example embodiment.

FIG. 2 shows communications network 20 which comprises base station 28 and wireless terminal 30, which communicate with each other over radio or air interface 32 (represented by a dash-dotted line). Wireless terminal 30 comprises communications interface 34 and congestion controller 40. The communications interface 34 may comprise one or more antennas and associated radio electronics preparatory or processing circuits, thereby facilitating radio communications on both a downlink (DL) from the base station 28 to the wireless terminal 20 and on an uplink (UL) from the wireless terminal 30 to the base station 28. In an example embodiment, the base station 28 may take the form of a NodeB, and accordingly the wireless terminal 30 is sometimes referred to herein as NodeB 28.

The congestion controller 44 of wireless terminal 30 is configured, upon occurrence of a congestion indication, to reduce uplink transmission power of the wireless terminal 30 by lowering a transport format combination for use by the wireless terminal for transmitting an enhanced dedicated uplink channel (E-DCH) over the radio interface 32 to the base station 28 without requiring a reduction in power for a Dedicated Physical Control Channel (DPCCH). In an example embodiment and mode, congestion controller 40 is configured, upon occurrence of the congestion indication, to perform an expedited transport format combination reduction procedure 42. As explained herein, the expedited transport format combination reduction procedure 42 is distinct from prior art power control techniques, and thus is distinct from a Dedicated Physical Control Channel (DPCCH) power reduction, e.g., the type of DPCCH power reduction based on a command received on, e.g., a Fractional-DPCH (F-DPCH) channel.

Figure 3:
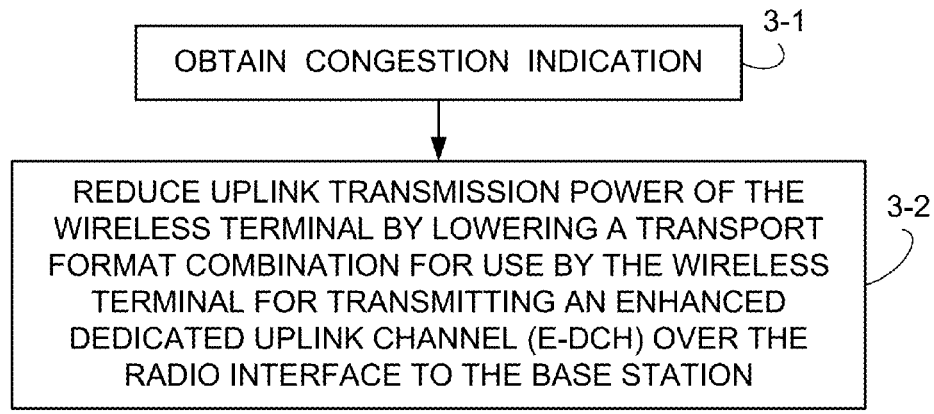
FIG. 3 is a flowchart illustrates example, representative acts or steps involved in a basic method according to an example embodiment or mode.

FIG. 3 illustrates example, representative acts or steps involved in a basic method according to an example embodiment or mode of the technology disclosed herein. Act 3-1 comprises the wireless terminal 30 obtaining a congestion indication over a radio interface with a base station. Then, in response to the congestion indication, as act 3-2 the congestion controller 40 of wireless terminal 30 reduces uplink transmission power of the wireless terminal by lowering a transport format combination for use by the wireless terminal for transmitting an enhanced dedicated uplink channel (E-DCH) over the radio interface to the base station.

Figure 4:
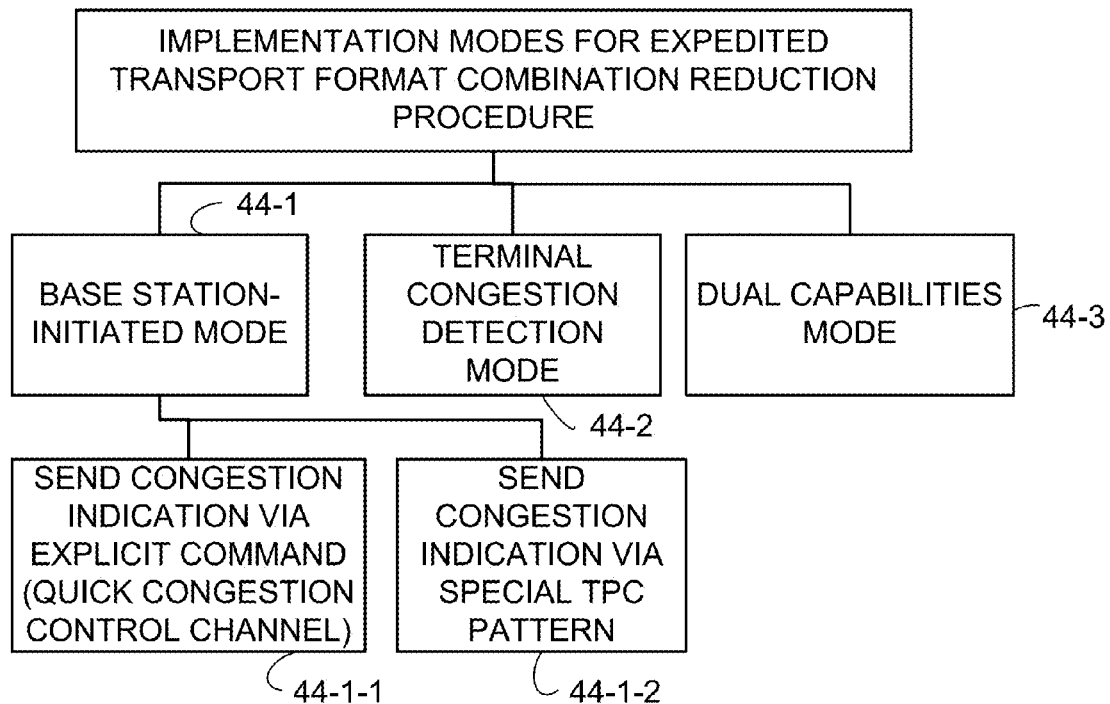
FIG. 4 is a diagrammatic view illustrating two example basic modes or scenarios of implementation of an expedited transport format combination reduction procedure 34.

FIG. 4 illustrates example basic modes or scenarios in which the basic method of FIG. 2, and the expedited transport format combination reduction procedure 34, may be implemented. In a first basic scenario, represented as base station-initiated mode 44-1, the base station 28 determines congestion in the network and sends an indication of congestion to wireless terminal 30. The base station-initiated mode 44-1 has various sub-modes as also illustrated in FIG. 4. In a second basic scenario, represented as terminal congestion detection mode 44-2, the wireless terminal 30 detects an indication of congestion (e.g., an abnormal condition) in the network and thus determines an occurrence of congestion. In a third basic scenario, represented as dual capabilities mode 44-3, the wireless terminal 30 has the capability of operating in either or both the base station-initiated mode 44-1 and the terminal congestion detection mode 44-2.

In other words, when there is risk of overload in the network, e.g., in a cell serving wireless terminal 30, either base station-initiated mode 44-1, the terminal congestion detection mode 44-2, or dual capabilities mode 44-3 may be implemented. In the base station-initiated mode 44-1, the NodeB 28 may start the expedited transport format combination reduction procedure 42 and in such case will inform or request wireless terminal 30 to reduce its transmission power (base station-initiated mode 40-1). In terminal congestion detection mode 44-2 wireless terminal 30 may detect the network congestion control (e.g., on the basis of already-existing signaling) and will initiate the expedited transport format combination reduction procedure 42. In the dual dual capabilities mode 44-3, the wireless terminal 30 may implement the expedited transport format combination reduction procedure 42 upon either being instructed to do so by the NodeB 28 (e.g., in the manner of base station-initiated mode 44-1) or upon the wireless terminal 30 itself detecting the network congestion (e.g., in the manner of terminal congestion detection mode 44-2). Each of these basic modes is described in more detail subsequently.

As mentioned above and illustrated in FIG. 4, the base station-initiated mode 44-1 has various possible sub-modes, with each sub-mode involving signaling an indication of congestion to wireless terminal 30. The nature of the signaling of the indication of congestion differs in each of the sub-modes.

Figure 5:
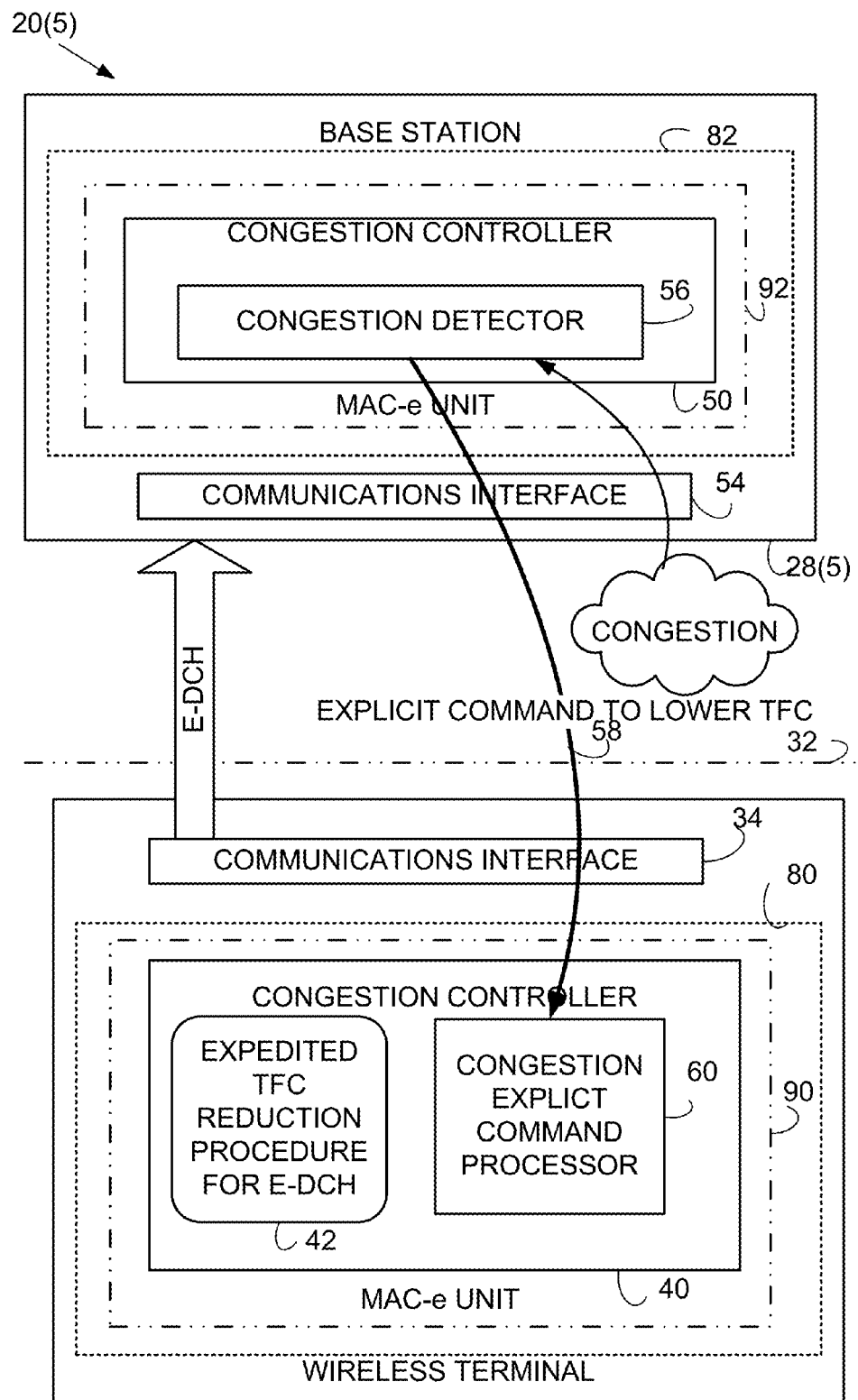
FIG. 5 is a schematic view of an example communications network according to an example embodiment suitable for performance of an explicit command sub-mode

FIG. 5 shows a communications network 20(5) suitable for illustrating operation of sub-mode 44-1-1, which is also referenced herein as explicit command sub-mode 44-1-1. The base station 28(5) of FIG. 5 comprises base station congestion controller 50 and base station communications interface 54. The base station congestion controller 50 in turn comprises congestion detector 56. Upon determination or detection of congestion by congestion detector 56, the base station congestion controller 50 of base station 28(5) sends the explicit command 58 to the wireless terminal 30 for the wireless terminal 30 to lower the TFC. At wireless terminal 30 the explicit command 58 is received by communications interface 34 and applied to congestion explicit command processor 60 which comprises congestion controller 40 of wireless terminal 30(5).

Thus, in the FIG. 5 example embodiment and mode the base station 28(5) sends an indication of congestion to the wireless terminal 30(5) using signaling which includes an explicit command to reduce the transport format combination (E-TFC). The explicit command is distinct from a Dedicated Physical Control Channel (DPCCH) power reduction command. As an example, in explicit command sub-mode 44-1-1 the wireless terminal 30 sends a signal in the form of an explicit command on, e.g., a quick congestion control channel (QCCCH).

The quick congestion control channel (QCCCH) can be any channel which is allocated upon determination of a congestion determination to carry an explicit command directing the wireless terminal 30 to reduce the transport format combination, the explicit command being generated in response to a congestion determination. The quick congestion control channel (QCCCH) may either be a new downlink channel (e.g., a downlink channel not presently defined in the 3GPP standards), or an existing downlink channel. When an existing channel is allocated to carry the explicit command, the existing channel is essentially transformed to serve at least as the quick congestion control channel (QCCCH), and may have other functions as well (including functions of the channel that was formerly known as the existing channel). When an existing channel is transformed to serve as the quick congestion control channel (QCCCH), physical aspects of the channel and coding may be retained, but the information transmitted on the channel is interpreted differently. This channel transformation involved in one aspect of the technology disclosed herein is similar to the already-existing case of the E-HICH channel, which is the same in the physical layer as the E-RGCH, but has different meaning and function. Thus, an existing channel which is transformed to serve as the quick congestion control channel (QCCCH) may have similar setup and physical components as the existing channel (e.g., an E-AGCH channel or E-RGCH channel), but the channel function is different and therefore the name of the channel is changed to the quick congestion control channel (QCCCH) for the purposes of the technology disclosed herein. For example, the existing E-AGCH channel and the existing E-RGCH channel include grants that serve for essentially permanent or long-term allocation resource allocations to the wireless terminal. On the other hand, the quick congestion control channel (QCCCH), which may have the same physical layer implementation of the E-AGCH channel or E-RGCH channel, or other implementations, has a different function of indicating temporal congestion conditions to the wireless terminal so that the wireless terminal may take action (e.g., reduce the E-TFC without requiring a reduction in power for a Dedicated Physical Control Channel (DPCCH) to reduce the congestion. Moreover, when an existing E-AGCH channel is provided, the wireless terminal may listen to an alternative or E-AGCH channel which serves as the quick congestion control channel (QCCCH) and which has a power offset signal which may be interpreted as a congestion indication.

However expressed, the congestion indication in the form of an explicit command is preferably sent immediately upon detection of congestion. A base station may have to wait to the next possible opportunity to transmit the congestion indication (e.g., in the quick congestion control channel (QCCCH)) in view of the transmission time interval (TTI) and time alignment of the channel, but the congestion indication is sent as soon as the channel allows the transmission. In an example embodiment and mode, the base station node has an option of using the expedited transport format combination reduction procedure 42 of the technology disclosed herein.

As shown in FIG. 4, in the explicit command sub-mode 44-1-1 the command to reduce the transport format combination may be formatted in a relative format. When the explicit command is in the relative format, the explicit command indicates that the wireless terminal 30 should reduce its transmission power or E-TFC index by a specified number of steps. In other words, the explicit command may comprise an indication of a number of steps by which the wireless terminal is to lower or reduce a previous transport format combination to obtain an updated transport format combination (the updated transport format combination for henceforth transmitting the enhanced dedicated uplink channel (E-DCH) over the radio interface to the base station). The amount of power or E-TFC indexes included in each step may be either signaled or predefined. For example, the explicit command may either contain only one bit (which may requests the wireless terminal 30 to reduce the E-TFC index by one step [either one E-TFC index or n E-TFC indexes, in accordance with how many index(es) the bit is predefined to represent]) or the explicit command may contain a number m bits so that it is able to indicate wireless terminal 30 explicitly how many steps the wireless terminal 30 should reduce in response to the explicit command. When wireless terminal 30 detects the explicit command having a relative format, the wireless terminal 30 updates transport format combination the as reflected by Expression (1).

$$E\text{-}TFC_{new} = E\text{-}TFC_{old} + STEPS_{reduction} \qquad \text{Expression (1)}$$

In Expression (1), $STEPS_{reduction}$ is the value to be used by expedited transport format combination reduction procedure 42, which is a negative value. The wireless terminal 30 then uses the updated $E\text{-}TFC_{new}$ as the transport formal combination for the E-DCH As mentioned above, the quick congestion control channel (QCCCH) which carries the explicit command may be an existing downlink channel that is allocated to carry the explicit command. In such case, the existing channel is essentially transformed to serve the function of the quick congestion control channel (QCCCH), although the channel may have other functions as well (including functions retained from the pre-existent channel).

An example of such existent channels to which the explicit command may be allocated and thus experience transformation to a new channel (quick congestion control channel (QCCCH)) as a result of carrying the explicit command is the HS-SCCH channel. In such example several wireless terminals may be allowed to monitor a "common HRNTI" configured on the HS-SCCH channel to signal the congestion indication. The "common HRNTI" may be, for example, a flag or an index value on the HS-SCCH channel). The wireless terminals configured with the feature should then act upon the reception of the HS-SCCH by matching the configured HRNTI and a specific command which indicates or signals the occurrence of congestion. This does not exclude the possibility of using an already assigned command (used for other purposes) since the "common HRNTI" is in use for the purpose of the indication and not UE Scheduling, meaning that the wireless terminals will maintain their own H-RMTI in order to interpret the regular HS-SCCH commands that are direct to that specific wireless terminal.

Regarding the "common HRNTI", the way in which the HS-SCCH channel works makes it necessary that the information that is transmitted have an identifier so that the wireless terminal for which the information is intended knows that it is for it. This is because is a shared channel and all the wireless terminals listen to the shared channel. Hence, the common HRNTI is herein employed as an example of one identifier (HRNTI) that may be understood by several wireless terminals to indicate that the information on the HS-SCCH channel is directed to them. Thus, with the same identifier (common HRNTI) a type of broadcast channel is created for transmitting to several wireless terminals, or even all the wireless terminals in a cell. Of course, there might be cases in which a CPC functions (if configured) results in a wireless terminal not listening all the time to the HS-SCCH channel all the time, in which cases some wireless terminals might miss the indication. This capability also means that the wireless terminal has to have HSDPA configured or at least a HSS-CCH-like channel configured (a new channel dedicated for FCC). The HRNTI is provided by the network to the wireless terminals and normally is unique at least in a geographical area. In varying embodiments the HRNTI could be called by another name or term if the channel is a new channel.

As indicated above, the quick congestion control channel (QCCCH) may be realized as a new channel which may be similar to but also distinct from the existing E-AGCH channel. The power offset signal by the congestion on such a modified or transformed E-AGCH could be interpreted by the wireless terminal as a number of indexes, offsets, or TFCI that has to be reduced from the actual value. For such purpose, the "actual value" may be agreed between the network and the wireless terminal, and based on such agreement may be, for example, any one of the following: (1) a reference E-TFC based on when the wireless terminal received the congestion indication (meaning that the congestion indication applies to the same value or definition used for reference ETPR on the Medium Access Control (MAC) protocol specification[3GPP TS 25.321, Version 11.0, incorporated herein by reference]); (2) the current serving grant; and (3) the E-TFC that would have been selected if no congestion indication had been given.

The quick congestion control channel (QCCCH) may also be realized as a new channel which may be similar to but also distinct from the existing E-RGCH channel. This new or transformed E-RGCH channel which serves as the quick congestion control channel (QCCCH) may be configured to be listened to by a group of wireless terminal in the serving cell (in parallel to the regular E-RGCH). Since this congestion indication channel is possible to be differentiated from the regular relative grant channel, the wireless terminal can apply different rules to the signaling received over the regular grant channel. One possibility is that the wireless terminal applies the congestion control signal received until an "up" (positive value) is received in the same congestion channel, marking the end of the congestion and therefore the reestablishment of the normal operation. This means that the wireless terminal will continue applying the restriction in its E-TFC selection even when receiving an increase in the power offset provided by the NodeB scheduler by means of the E-AGCH or the E-RGCH. Another possibility is to apply the congestion control for a specified period of time after the reception of the congestion indication signal.

The new explicit command signaling of explicit command sub-mode 44-1-1 may be utilized in conjunction with other (e.g., existing) scheduling and power control operations. For example, the NodeB 28(5) can either transmit consecutive TPC DOWN commands to the wireless terminals, as done in traditional FCC, or keep a normal inner-loop power control procedure. The advantage for the NodeB still transmitting consecutive TPC DOWN commands to the wireless terminals as traditional FCC is that a legacy wireless terminal can react by reducing DPCCH power to help solve the congestion in the cell. However, in this case, even if the NodeB 28(5) transmits consecutive TPC DOWN commands to the wireless terminal, the wireless terminal should not reduce the DPCCH power according to the TPC command if the wireless terminal also receives the new congestion indication signaling (i.e., the explicit command) from the NodeB 28(5). Instead, the TPC command received from the NodeB 28(5) in a pre-configured time period can be used to estimate the amount of power or E-TFC that the wireless terminal is required to reduce. In this case, it is enough for the explicit command to contain only one bit as the amount of power/E-TFC reduction is signaled by the power control commands.

The communications network 20(5) of FIG. 5 is also suitable for illustrating operation of sub-mode 44-1-2, which is also referenced herein as special TPC pattern sub-mode 44-1-2. In special TPC pattern sub-mode 44-1-2, the congestion indication transmitted from base station 28(5) to wireless terminal 30(5) comprises either (1) a predetermined number of transmit power control (TPC) DOWN commands received in a given time period or (2) a predetermined pattern of transmit power control (TPC) commands.

In an example embodiment and mode, the signal of base station-initiated mode 44-1 (any sub-mode) that prompts the wireless terminal 30 to reduce its TFC may either be a broadcast signal which has been broadcast to plural wireless terminals, or an addressed signal which has been uniquely addressed to the wireless terminal 30 (e.g., carried on a dedicated channel). The congestion explicit command processor 60 which prepares such signal, and the wireless terminal congestion controller 40 which receives and processes such signal, may be configured according to either or both the addressed or the broadcast modes.

Figure 6:
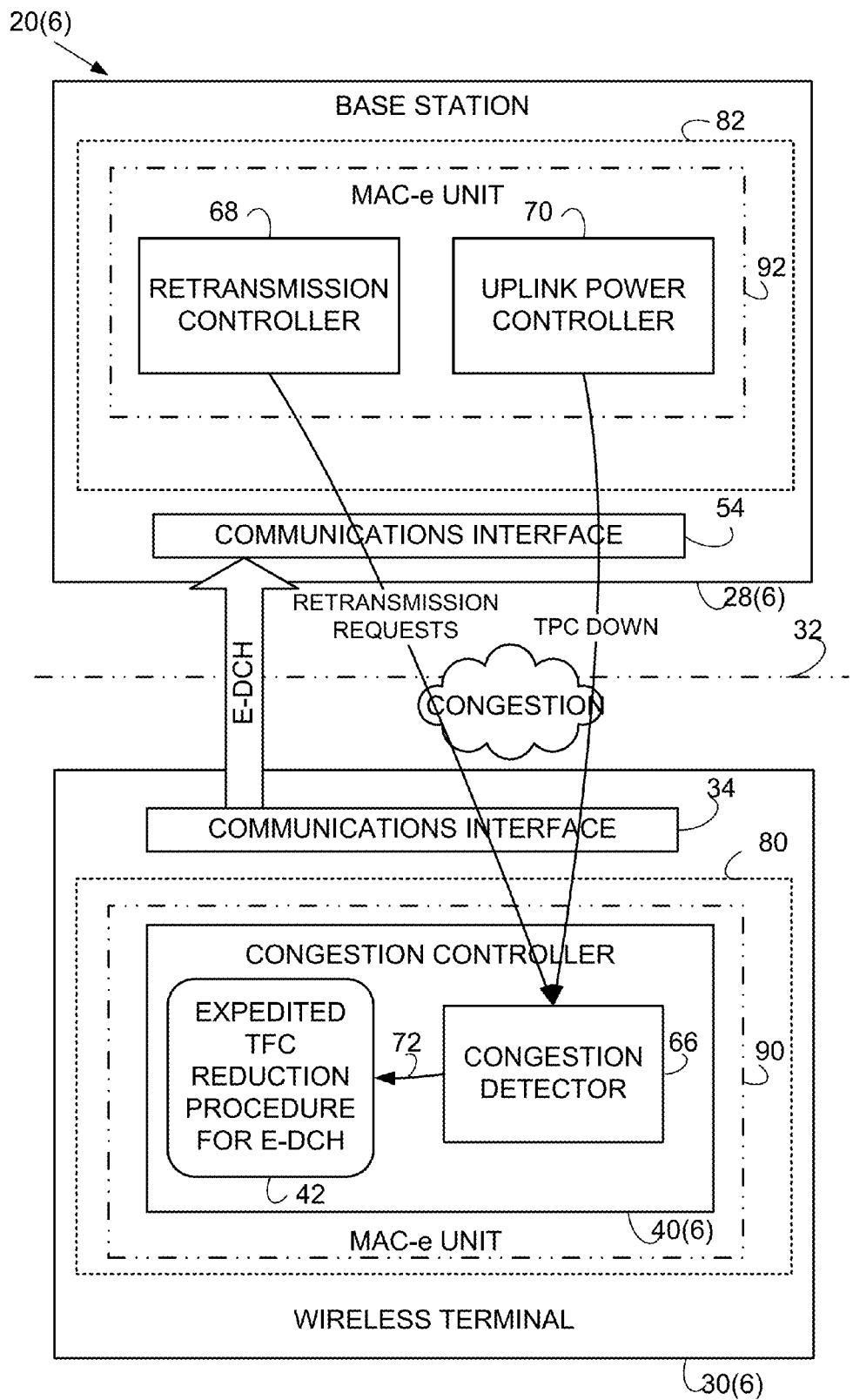
FIG. 6 is a schematic view of an example communications network according to an example embodiment suitable for performance of a terminal congestion detection mode

FIG. 6 shows a communications network 20(6) suitable for illustrating operation of mode 44-2, which is also referenced herein as terminal congestion detection mode 44-2. In the embodiment and mode of FIG. 6 the congestion controller 40(6) of wireless terminal 30(6) comprises not only the expedited transport format combination reduction procedure 42, but also terminal congestion detector 66. In the terminal congestion detection mode 44-2, the congestion indication comprises one or more signals received by the wireless terminal 30(6) over the radio interface 32. In the terminal congestion detection mode 44-2 the terminal congestion detector 66 of congestion controller 40(6) is configured to discern from the one or more signals an abnormal situation that gives rise to the congestion indication.

The one or more signals from which the congestion indication is discerned are received by the wireless terminal 30(6) and assessed by terminal congestion detector 66 to detect network congestion. Preferably the one or more such signals are signals which are existing in the network, such as currently defined 3GPP signals, and thus not signals specially generated (such as a signal carried on a quick congestion control channel (QCCCH)) for the expedited transport format combination reduction procedure 42.

As one non-limiting example, the one or more signals from which the abnormal situation (and thus the congestion indication) is discerned may comprise, as a first signal, a transmit power control (TPC) DOWN command which is received at a time when there is a high retransmission rate, e.g., when the retransmission rate exceeds a predetermined value. Thus, the abnormal situation comprises a predetermined retransmission rate and receipt of a transmit power control (TPC) DOWN command. To reflect this particular non-limiting example FIG. 6 illustrates base station 28(6) as comprising retransmission controller 68 and uplink power controller 70. The retransmission controller 68 generates requests for retransmission when, e.g., signals applied on the uplink (UL) from wireless terminal 30(6) to base station 28(6) are not received or are not of sufficient quality. The uplink power controller 70 generates the transmit power control (TPC) DOWN command.

Thus, in the FIG. 6 example detection of the abnormal situation occurs when two conditions are simultaneously fulfilled: (1) a high retransmission rate and (2) a TPC DOWN command from the NodeB 28(6). In normal operation (with no congestion), a TPC DOWN signal should not occur with a high retransmission rate, because with the normal power control, the TPC DOWN command means that the transmit power is higher than the minimum required power to maintain the desired block error rate/retransmission rate. Therefore, with these two conditions fulfilled, the UE can conclude that there is an ongoing RoT rush in the cell, and that the NodeB 28(6) should be executing congestion control. Condition 1, the high retransmission rate, may be detected by a high rate of received NACKs on the E-HICH channel. Condition 2 may be detected according to the inner loop power control (ILPC) command received on, e.g., the F-DPCH. These two downlink control channels are monitored during the interval of the E-TFC selection function and, based on the NACK and TPC statistics during this time period, are used to determine if there is congestion in the cell.

A high retransmission rate and receipt of a TPC DOWN command are just two, non-limiting examples of conditions that may be an indication that the expedited transport format combination reduction procedure 42 needs to be executed. When such an abnormal situation is detected, the terminal congestion detector 66 declares congestion and invokes the expedited transport format combination reduction procedure 42, as illustrated by arrow 72 in FIG. 6.

When there is a need for quick congestion control, either in the base station-initiated mode 44-1, the terminal congestion detection mode 44-2, or the dual capabilities mode 44-3, the wireless terminal is required to take action and reduce its transmission power as quickly as possible. There are several alternatives to how the wireless terminal can reduce its transmission power. What alternative the wireless terminal should use can either be predefined or the wireless terminal may exercise its own discretion to choose an appropriate E-TFC reduction technique. One way of reducing E-TFC, applicable for the base station-initiated mode 44-1, is for the wireless terminal to reduce directly the E-TFC index, as above described with reference to Expression (1), for example. Other ways of reducing E-TFC, applicable to all modes, are now described with reference to FIG. 7 (for an example power limited scenario) and to FIG. 8A and FIG. 8B (for an example unlimited wireless terminal power scenario). Thus, in the differing example E-TFC selection procedures described below, how the detection of congestion affects the E-TFC selection may depend on whether the wireless terminal is "power limited" or not. Thus, the ensuing discussion of E-TFC selection includes both a power limited scenario and a scenario in which power is not limited. Whether or not a particular wireless terminal is power limited will be known by that terminal. How or why a terminal knows whether it is power limited or not is not germane to the technology disclosed herein.

Figure 7:
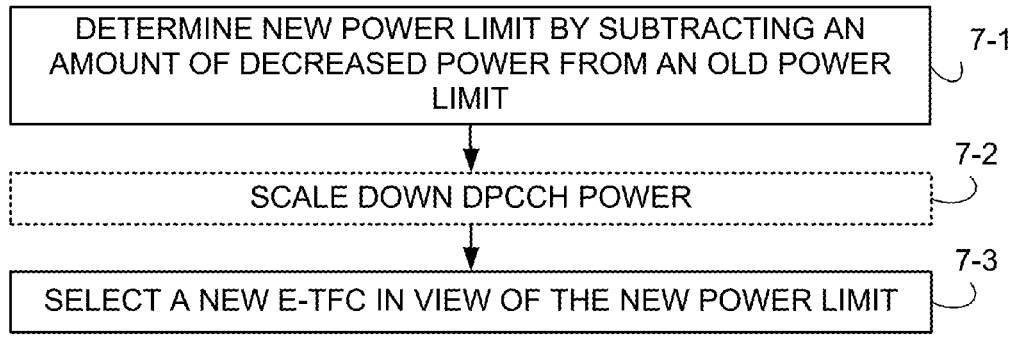
FIG. 7 is a flowchart showing basic acts or steps for selecting an updated transport format combination in a wireless terminal limited power scenario according to an example embodiment and mode.

In the wireless terminal power limited scenario, congestion controller is configured to determine a new or updated transport format combination by performing basic acts or steps illustrated in FIG. 7. In the power limited scenario, where there is congestion in the network the DPCCH power must be sufficiently decreased to lead to an actual decrease in total transmit (Tx) power of the wireless terminal. The requirement for a true decrease in total Tx power is because prior art practices such as Fast Congestion Control (FCC) may not immediately take effect, and in such case a decrease of DPCCH power will lead to an increase in E-DPDCH power offset. This may destroy both DPCCH transmission and data transmission.

Accordingly, for a power limited scenario of an example embodiment of the technology disclosed herein, when the wireless terminal detects the congestion control action of the serving cell, the expedited transport format combination reduction procedure 42 reduces the maximum allowed power as understood from Expression (2). The reduction of maximum allowed power is performed instead of simply reducing the DPCCH power as usual. As shown by Expression (2), the maximum allowed power is reduced from an old or original power limit ($P_{limit}$) to obtain a new power limit ($P_{limit,new}$) according to either the received TPC commands in a predefined time period, or via explicit signaling which indicates by how much power ($P_{decrease}$) the wireless terminal should reduce.

$$P_{limit,new} = P_{limit} - P_{decrease} \quad \text{Expression (2)}$$

Thus, as reflected by Expression (2), act 7-1 of FIG. 7 comprises determining a new power limit $P_{limit,new}$ by deducting the amount of decreased power $P_{decrease}$ decrease from the original power limit $P_{limit}$. $P_{decrease}$ decrease may be obtained by explicit signaling or, as understood from Expression (3), by accumulating the TPC command during a predefined time period, for example the period of the E-TFC selection interval.

$$P_{decrease} = \sum_{E\text{-}TFC\_selection\_period} \text{TPC\_DOWN} \quad \text{Expression (3)}$$

Moreover, in addition to the reduction of the maximum allowed power implemented by the expedited transport format combination reduction procedure 42, as an optional act 7-2 the DPCCH power can also be scaled down as understood from Expression (4).

$$P_{DPCCH,new} = P_{DPCCH,nope} - k \bullet \sum_{E\text{-}TFC\_selection\_period} \text{TPC\_DOWN} \quad \text{Expression (4)}$$

In Expression (4), $P_{DPCCH,nope}$ is the DPCCH power without applying the TPC commands, and $0 \le k \le 1$. Setting k equal to zero (0) means no scaled down on DPCCH power; setting k equal to one (1) means fully scaled down on DPCCH power according to the received TPCs. For example, a smaller k can be adopted for delay sensitive traffic and a larger k for delay insensitive traffic.

Act 7-3 comprises selecting a new E-TFC, e.g., E-TFC$_{selected,new}$ in view of the new power limit in a manner understood from Expression (5).

$$\beta_{selected,new} = \qquad\qquad\qquad\qquad\text{Expression (5)}$$
$$\max_j\left((\beta_j + \beta_{E\text{-}DPCCH} + 1)\cdot P_{DPCCH,new} \le P_{limit,new}\right)$$

In Expression (5), "j" is an index which indicates a particular E-TFC of a set or pool of possible E-TFCs. For example, a wireless terminal may have access to a set of perhaps thirty E-TFCs, so that j could be a number from between 1 and 30. In Expression (5), $\beta_j$ is the power offset of the $j^{th}$ E-TFC, $\beta_{E\text{-}DPCCH}$ is the power offset of channel E-DPCCH, and "1" is the power offset of DPCCH. Expression (5) thus calculates the required power of each E-TFCj, and selects as $\beta_{selected,new}$, the selected or new E-TFC, the maximum E-TFC$_j$ which can fulfill the condition that the total required power is lower than the power limit. As explained previously, there is a one-to-one mapping between power offset values and E-TFCs. Therefore, the $\beta_{selected,new}$ can be viewed as the selected E-TFC. Therefore, since the product of $(\beta_j+\beta_{E\text{-}DPCCH}+1)$ and $P_{DPCCH,new}$ is the total required power for the E-TFC$_j$, e.g., the jth E-TFC, it must be below the power limit (the power limit is the maximum power that can be allocated for E-DCH transmission). The new maximum power limit $P_{limit,new}$ is obtained by Expression (2) and is decreased according to the this example embodiment and mode. Thus, E-TFC selection involves selecting an E-TFC which is the maximum one and at the same time can fulfill the power limit. That is, an updated transport format combination is selected which maximizes E-DCH power and also fulfills a condition that total required power for the uplink is lower than the specified maximum allowed uplink transmission power.

For k=1, the E-DPDCH power offset will keep unchanged; for k<1, the E-DPDCH power offset will then decrease. In any case, the E-DPDCH power offset will not increase and thus avoid excessive block error rate (BLER) increase while at the same time the total Tx power of the wireless terminal will immediately decrease once Congestion Control action is detected.

When the reduced power limit is not enough to select a lower E-TFC, the DPCCH power needs to be reduced according to the TPC command as in a usual inner loop power control (ILPC).

When the wireless terminal is not "power limited", the E-TFC selection performed by the expedited transport format combination reduction procedure 42 operates in a scenario in which power is not limited. In the wireless terminal unlimited power scenario, congestion controller 40(6) is configured to determine an updated transport format combination by performing basic acts or steps illustrated in FIG. 8A. Act 8A-1 comprises subtracting a requested uplink transmission power reduction value from a power value afforded a previous transport format combination to obtain a power limit for a new transport format combination. Act 8A-2 comprises using the new power limit to determine the new transport format combination.

As with the power limited scenario, in the wireless terminal unlimited power scenario the power decrease value may be determined by accumulating plural total power control commands over a transport format combination selection interval. Alternatively or additionally, the power decrease value may be received in a signal from the base station.

Figure 8A:
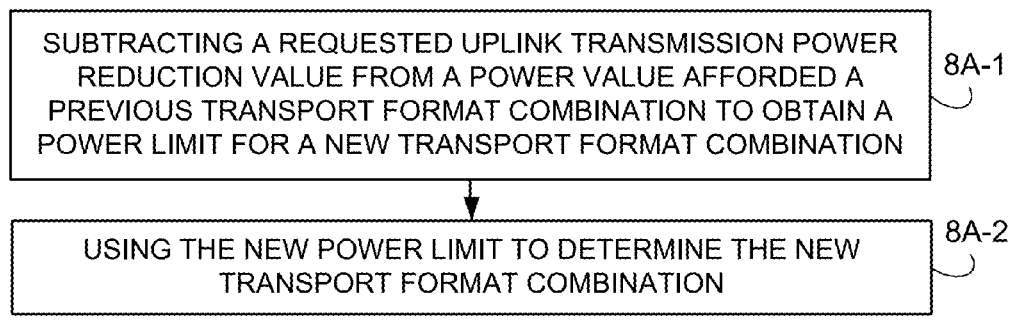
FIG. 8A is a flowchart showing basic acts or steps for selecting an updated transport format combination in a wireless terminal unlimited power scenario according to an example embodiment and mode.
Figure 8B:
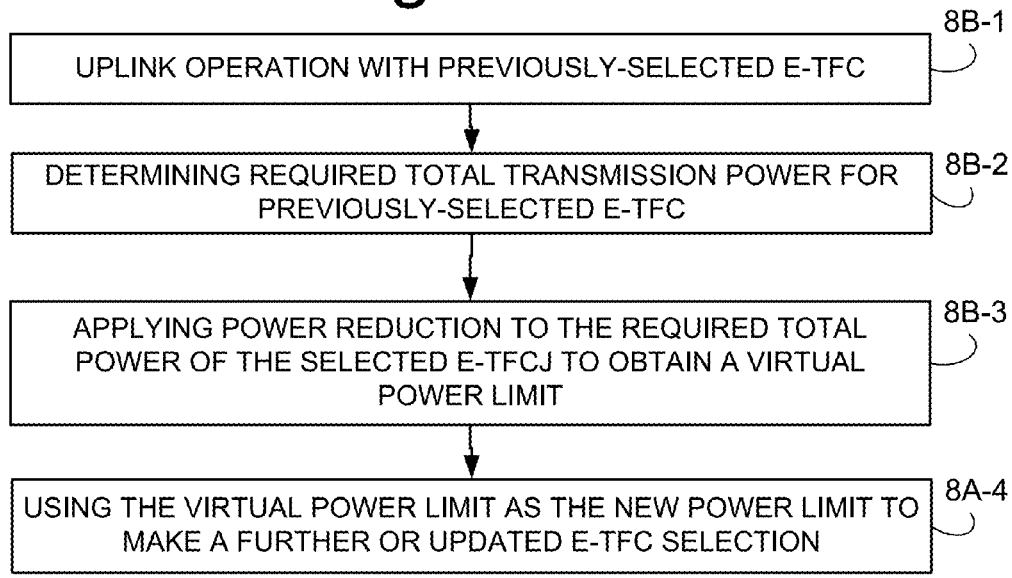
FIG. 8B is a flowchart showing more detailed acts or steps for selecting an updated transport format combination in a wireless terminal unlimited power scenario according to an example embodiment and mode.

FIG. 8B shows more detailed acts or steps for selecting an updated transport format combination in a wireless terminal unlimited power scenario according to an example embodiment and mode.

Act 8B-1 assumes that the wireless terminal is operating on the uplink (UL) with a transport format combination (E-TFC) that has been selected in conventional manner, e.g., the DPCCH is following the TPC commands as usual. For notational purposes the previously selected transport format combination is assumed to be $j^{th}$ E-TFC (E-TFCj). Thus, act 8B-1 represents uplink operation with a previously-selected E-TFC.

Act 8B-2 comprises determining (e.g., calculating) a required total transmission power for the transport format combination selected for act 8B-1, e.g., determining the required total transmission power for E-TFCj. The determining the required total transmission power for E-TFCj is shown in Expression (6).

$$P_{required}=(1+\beta_{E\text{-}DPCCH}+\beta_j)\cdot P_{DPCCH,pc} \qquad\text{Expression (6)}$$

In Expression (6) $P_{DPCCH,pc}$ corresponds to a DPCCH power applying the TPC commands as in normal inner loop power control (ILPC), $\beta_{E\text{-}DPCCH}$ and $\beta_j$ are the respective power offsets of E-DPCCH and E-DPDCH with E-TFCj relative to DPCCH.

Act 8B-3 comprises applying a power reduction (e.g., $P_{decrease}$) to the required total power of the selected E-TFCj to obtain a virtual power limit, in a manner such as that illustrated by Expression (7). In Expression (7), the power reduction (e.g., $P_{decrease}$) may be known or received by the wireless terminal according to either explicit signaling or the TPC DOWN commands accumulated during the predefined time period.

$$P_{virtual\_limit}=P_{required}-P_{decrease} \qquad\text{Expression (7)}$$

Act 8B-4 comprises applying or using the virtual power limit as the new power limit to make a further or updated E-TFC selection, e.g., selecting E-TFC$_{selected,new}$, in a manner such as illustrated by Expression (8).

$$\beta_{selected,new} = \qquad\qquad\qquad\qquad\text{Expression (8)}$$
$$\max_i\left((\beta_i + \beta_{E\text{-}DPCCH} + 1)\cdot P_{DPCCH,new} \le P_{virtual\_limit}\right)$$

In Expression (8), $\beta_{selected,new}$ is the power offset of the finally selected E-TFC. As explained previously, there is a one-to-one mapping between power offset values and E-TFCs. Therefore, the $\beta_{selected,new}$ can be viewed as the selected E-TFC. In Expression (8), $\beta_i$ is the power offset of the $i^{th}$ E-TFC, $\beta_{E\text{-}DPCCH}$ is the power offset of channel E-DPCCH, and "1" is the power offset of DPCCH. Therefore, since the product of $(\beta_i+\beta_{E\text{-}DPCCH}+1)$ and $P_{DPCCH,new}$ is the total required power for the potential newly selected E-TFC it must be below the power limit (the power limit is the new maximum power limit $P_{virtual\_limit}$ that can be allocated for E-DCH transmission). Therefore, Expression (8) seeks to find a maximum transport format combination which can fulfill this new power limit $P_{virtual\_limit}$, the power limit being (in this case not a true power limit) but a limit reduced relative to the required power of the previously selected transport format combination, e.g., relative to E-TFC$_j$. The new maximum power limit $P_{virtual\_limit}$ is obtained by Expression (7), e.g., by applying a power reduction to the required power of the previously selected E-TFC.

With the second round of E-TFC selection, e.g., the selection of the updated or new E-TFC in the manner of Expression (8), a lower E-TFC is expected to be selected with lower required transmission power which does not exceed the virtual power limit. However, if the virtual power limit (determined, e.g., by Expression (7)) is still not low enough to select a lower E-TFC, the DPCCH power may be reduced according to the TPC command as in usual inner loop power control (ILPC).

Figure 9:
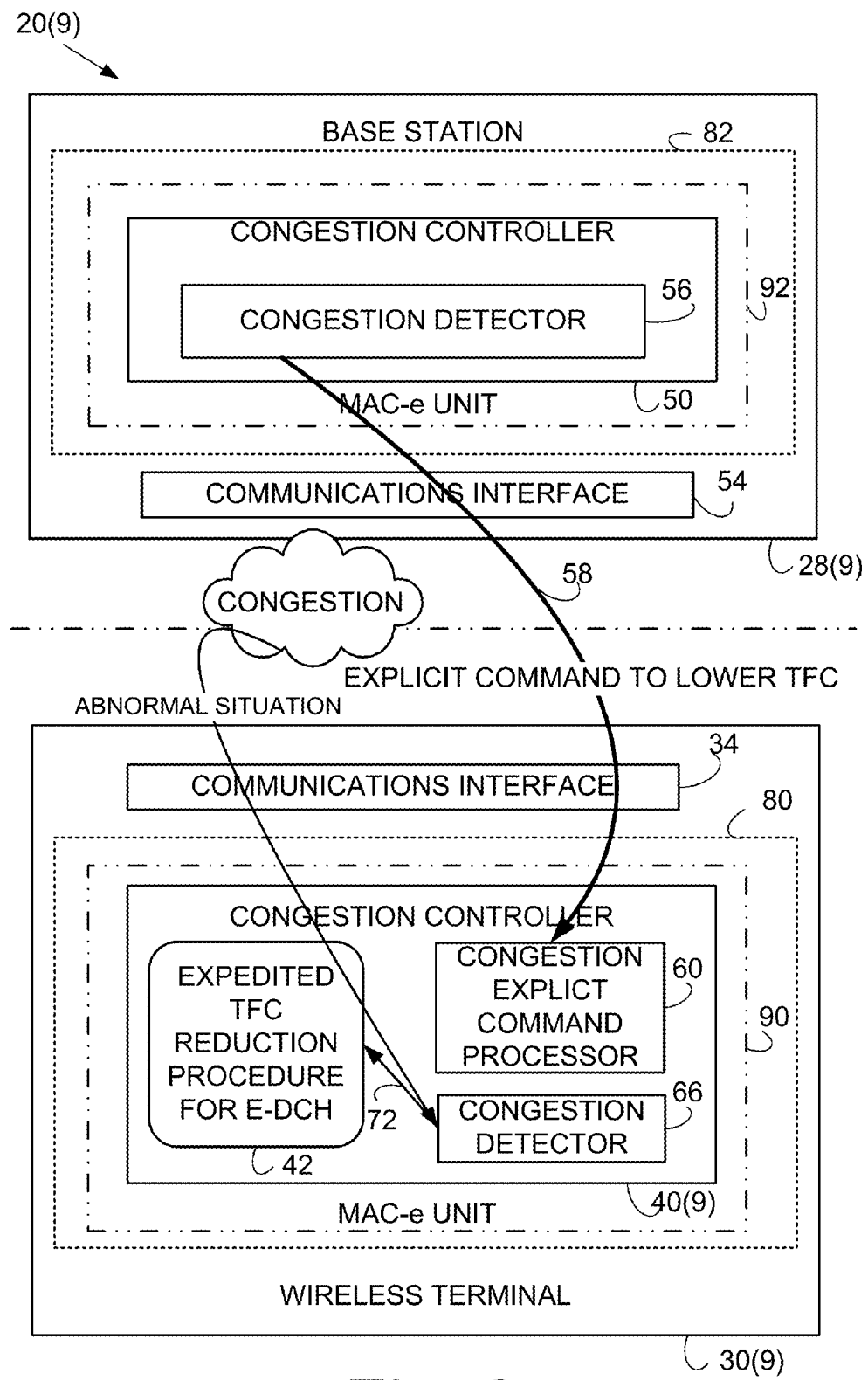
FIG. 9 is a schematic view of an example communications network according to an example embodiment suitable for performance of a dual capabilities mode.

FIG. 9 shows a communications network 20(9) suitable for illustrating operation of dual capabilities mode 44-3. As mentioned above, in the dual capabilities mode 44-3 the wireless terminal 30 may implement the expedited transport format combination reduction procedure 42 upon either being instructed to do so by the NodeB 28 (e.g., in the manner of base station-initiated mode 44-1) or upon the wireless terminal 30 itself detecting the network congestion (e.g., in the manner of terminal congestion detection mode 44-2).

In the embodiment and mode of FIG. 9, in like manner with the FIG. 5 embodiment base station 28(9) comprises base station congestion controller 50 and base station communications interface 54. The base station congestion controller 50 in turn comprises congestion detector 56. At wireless terminal 30(9) the explicit command 58 is received by communications interface 34 and applied to congestion explicit command processor 60 which comprises congestion controller 40(9) of wireless terminal 30(9). The congestion controller 40(9) of wireless terminal 30(9) comprises not only the expedited transport format combination reduction procedure 42, but also terminal congestion detector 66. If the congestion detector 56 of base station 28(9) detects network congestion, the base station congestion controller 50 of base station 28(9) sends the explicit command 58 to the wireless terminal 30(9) for the wireless terminal 30 to lower the TFC. Alternatively, the terminal congestion detector 66 may operate in the manner above described with respect to terminal congestion detection mode 44-2 to discern from one or more signals an abnormal situation that gives rise to the congestion indication.

Figure 10:
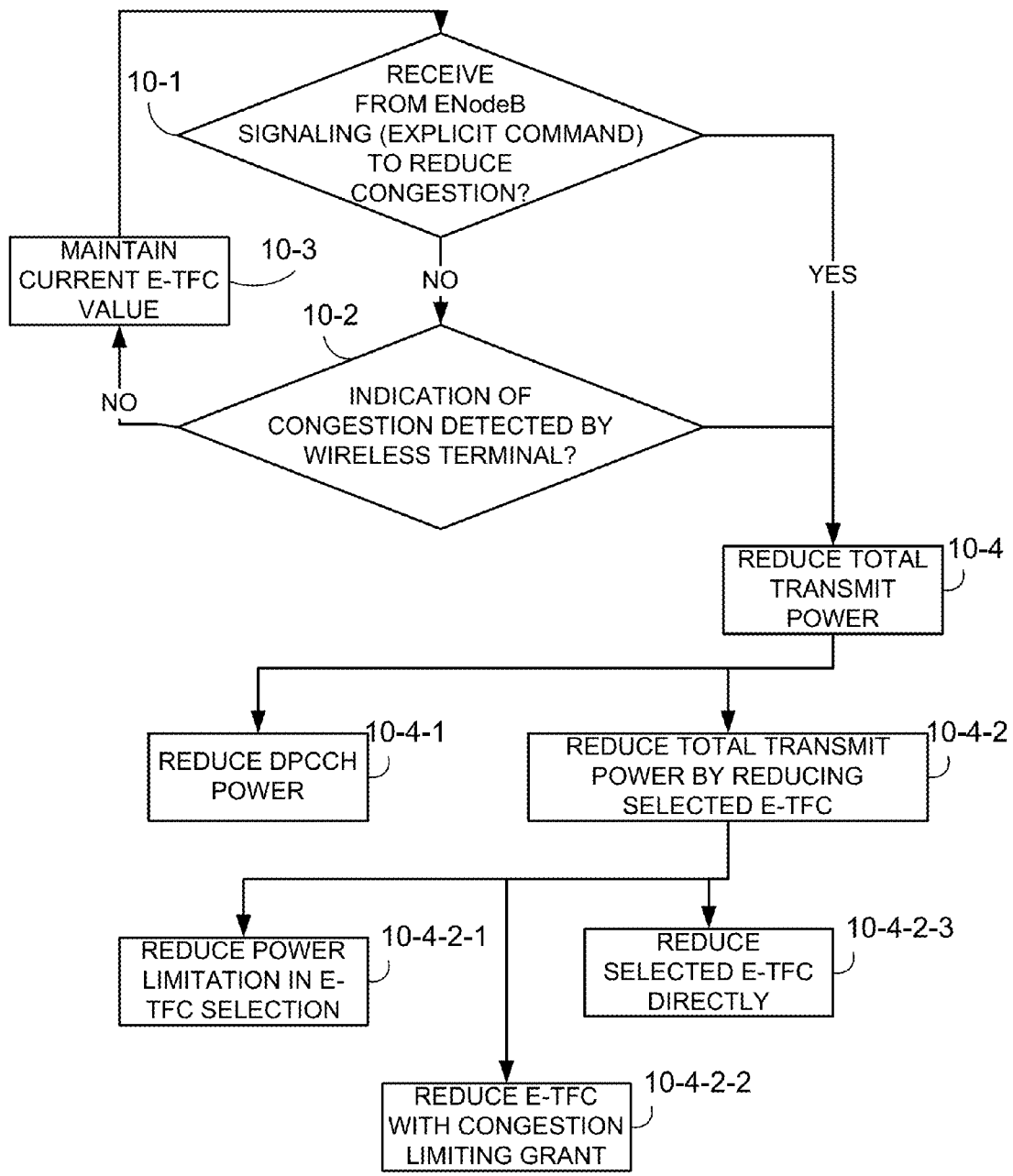
FIG. 10 is a flowchart showing more example acts or steps that may be performed by an example congestion controller and particularly a congestion controller operating in a dual capabilities mode.

FIG. 10 illustrates basic example acts or steps that may be performed by an example congestion controller, such as congestion controller 40(9) of the dual capabilities mode 44-3. As act 10-1 the congestion controller 40(9) determines whether it has received a base station-initiated indication of congestion, e.g., an explicit command to reduce the transport format combination. If no such indication has been received from the base station, as act 10-2 the congestion controller 40(9) checks whether its terminal congestion detector 66 has detected an indication of congestion, e.g., an abnormal situation which may be indicative of congestion. If the neither the check of act 10-1 or act 10-2 is positive, the same E-TFC is maintained (as indicated by act 10-3). But if check of either act 10-1 or 10-2 is positive, as act 10-4 the congestion controller 40(9) seeks to reduce total uplink (UL) transmit power. Reduction of total uplink (UL) transmit power can occur in either of two main alternatives. As a first alternative, which forms prior art Fast Congestion Control and is indicated by act 10-4-1, the congestion controller 40(9) may reduce DPCCH power. As a second alternative, indicated by act 10-4-1, the congestion controller 40(9) may reduce total transmit power by reducing the selected E-TFC. Act 10-4-1 in turn may be implemented by any of three separate alternatives. As a first alternative represented by act 10-4-2-1, the congestion controller 40(9) may reduce the power limitation in the E-TFC selection. As a second alternative represented by act 10-2-2, the congestion controller 40(9) may reduce the scheduling grant in the E-TFC selection. As a third alternative represented by act 10-4-1-3, the congestion controller 40(9) may reduce the selected E-TFC directly.

As indicated above, whenever there is a need for quick congestion control, the wireless terminal is required to take action and reduce its transmission power as quickly as possible. As explained above, and further illustrated by FIG. 10, there are several alternatives to how the wireless terminal can reduce its transmission power. What alternative the wireless terminal should use can either be predefined or the wireless terminal may exercise its own discretion to choose an appropriate E-TFC reduction technique. Various ways of reducing E-TFC have been described above, are also illustrated as 10-4-2-1 through act 10-4-2-3 in FIG. 10, each of which is briefly reviewed below.

Act 10-4-2-1 comprises decreasing power constraints. According to this technique, whenever the wireless terminal receives an explicit congestion control indication signaling or detects the congestion control via existing signaling, the wireless terminal impacts E-TFC selection by decreasing the power limitation. The detailed procedure depends on whether the wireless terminal is power limited or not. FIG. 7 describes an example power limited scenario; FIG. 8A and FIG. 8B discussed above describe example unlimited wireless terminal power scenarios.

Act 10-4-2-2 comprises reducing E-TFC on the basis of a congestion indication which results from an explicit command sent from the base station node. This technique is useful in base station-initiated mode 44-1 in which the NodeB 28 provides an explicit command to reduce E-TFC. Whenever wireless terminal detects the explicit command, the wireless terminal updates the scheduling grant in the manner above described when the new congestion indication is in relative form. The wireless terminal then applies the updated scheduling grant to the E-TFC selection procedure as normal.

Act 10-4-2-3 comprises decreasing the selected E-TFC directly. In this technique, the wireless terminal selects the E-TFC by applying the normal power constrains and scheduling grant constrains as normal. However, whenever the wireless terminal receives an explicit congestion control indication signaling (e.g., the explicit command of base station-initiated mode 44-1) or detects the congestion control via existing signaling (e.g., via terminal congestion detection mode 44-2, the wireless terminal directly decreases the selected E-TFC index by the appropriate steps. As explained previously, the step size and the number of steps can either be predefined or be signaled.

The congestion indications, in whatever form sent or received, serve as a trigger for procedures described herein, including as a trigger for the expedited transport format combination reduction procedure 42. Additionally, a further indication may also be received by the wireless terminal in order to signal the end of the congestion. Alternatively, the congestion time may be specified or configured in the wireless terminal either by dedicated signaling or mutual agreement with the network, in order to permits the wireless terminal to apply the expedited transport format combination reduction procedure 42 during the time specified from the time when the congestion indication is received by the wireless terminal.

FIG. 11 is a diagrammatic view illustrating the expedited TFC reduction procedure for E-DCH using the explicit command sub-mode 44-1 in the context of a conventional E-TFC selection scheme. FIG. 11 thus shows an embodiment of the congestion controller of the technology disclosed herein, which performs the expedited transport format combination reduction procedure 42 upon receiving the quick congestion control (QCCCH) signal which is processed by the congestion explicit command processor 60. FIG. 12 illustrates the expedited TFC reduction procedure for E-DCH using the terminal congestion detection mode 44-2 in the context of a conventional E-TFC selection scheme. FIG. 12 thus shows an embodiment of the congestion controller of the technology disclosed herein, which performs the expedited transport format combination reduction procedure 42 when congestion detector 66 detects the congestion. Although not explicitly shown, in both FIG. 11 and FIG. 12 the power available for the E-DCH needs to take into account possible transmissions of the other control channels for example HS-DPCCH if scheduled at the same time, e.g., a reduction from the total available power by taking into consideration the power of the HS-DPCCH.

FIG. 11 is a diagrammatic view illustrating the expedited TFC reduction procedure for E-DCH using the explicit command sub-mode 44-1 in the context of a conventional E-TFC selection scheme. FIG. 11 thus shows an embodiment of the congestion controller of the technology disclosed herein, which performs the expedited transport format combination reduction procedure 42 upon receiving the quick congestion control (QCCCH) signal which is processed by the congestion explicit command processor 60. FIG. 12 illustrates the expedited TFC reduction procedure for E-DCH using the terminal congestion detection mode 44-2 in the context of a conventional E-TFC selection scheme. FIG. 12 thus shows an embodiment of the congestion controller of the technology disclosed herein, which performs the expedited transport format combination reduction procedure 42 when congestion detector 66 detects the congestion. Although not explicitly shown, in both FIG. 11 and FIG. 12 the power available for the E-DCH needs to take into account possible transmissions of the other control channels for example HS-DPCCH if scheduled at the same time, e.g., a reduction from the total available power by taking into consideration the power of the HS-DPCCH.

In both FIG. 11 and FIG. 12 the conventional E-TFC selection scheme is shown in broken lines as being dependent both upon a serving grant (which in turn is based upon either an absolute or a relative scheduling grant) and upon residual power resulting from a closed loop power control operation (e.g., inner loop power control). The aforementioned FCC TPC DOWN of the Fast Congestion Control (FCC) is a special case of closed loop power control. In conjunction with the conventional E-TFC selection scheme the TFCs for the DCHs are selected based on the closed loop power control (TPC commands), which also affects power for the DPCCH channel.

On the other hand, as illustrated in FIG. 11 and FIG. 12 the technology disclosed reduces the transmission power of a wireless terminal (UE) by selecting a lower E-TFC quickly upon detection of congestion without first using a closed loop power control to decrease the transmission power of DPCCH. In a power limited scenario the technology disclosed herein may optionally scale down the DPCCH power (see act 7-2 and Expression (4)), but even in such case does not employ the closed loop power control for such scaling. Consequently, the technology disclosed herein controls the uplink load without necessarily causing a high retransmission due to low DPCCH power.

In an example embodiment and as depicted by way of example in FIG. 2, FIG. 5, FIG. 6, and FIG. 9, the congestion controller of the wireless terminal of various embodiments may be realized by a machine platform. To this end, these figures employ a broken line to represent machine platform 80 which comprises the congestion controller. Similarly, in various figures the base station congestion controller may also be realized by machine platform, as depicted by broken line 82. The terminology "machine platform" is a way of describing how the functional units of either wireless terminal congestion controller or base station congestion controller can be implemented or realized by machine. The machine platforms 80, 82 can take any of several forms, such as (for example) electronic circuitry in the form of a computer implementation platform or a hardware circuit platform. A computer implementation of the machine platform may be realized by or implemented as one or more computer processors or controllers as those terms are herein expansively defined, and which may execute instructions stored on non-transient computer-readable storage media. In such a computer implementation the machine platforms may comprise, in addition to a processor(s), a memory section (which in turn can comprise random access memory; read only memory; an application memory (a non-transitory computer readable medium which stores, e.g., coded non instructions which can be executed by the processor to perform acts described herein); and any other memory such as cache memory, for example). Another example platform suitable for the congestion controller and base station congestion controller is that of a hardware circuit, e.g., an application specific integrated circuit (ASIC) wherein circuit elements are structured and operated to perform the various acts described herein.

The functions of the wireless terminal congestion controller and the base station congestion controller may be fulfilled by various entities modified so as to perform the acts described herein. For example, as one example the wireless terminal congestion controller and the base station congestion controller may be included in or comprise a MAC-e unit or entity. To illustrate such optional, example implementation the wireless terminal congestion controller is illustrated in some figures as comprising MAC-e unit 90 and the base station congestion controller is illustrated in some figures as comprising MAC-e unit 92. The MAC-e unit 90 and the MAC-e unit 92 are depicted by dashed-double dotted lines.

As used herein, "terminal" or "wireless terminal" or "user equipment (UE)" may be a mobile station such as a mobile telephone or "cellular" telephone or a laptop with wireless capability, e.g., mobile termination, and thus may be, for example, a portable, pocket, hand-held, computer-included, or car-mounted mobile device which communicates voice and/or data via a radio access network. Moreover, a terminal or wireless terminal or UE may be a fixed terminal which communicates voice and/or data via a radio access network.

The technology disclosed herein afford many advantages. Example, non-limiting advantages include the following:

RoT may be better controlled by fast reaction in E-TFC selection by the wireless terminal.

At the same time the retransmission rate can be effectively kept in an adjustable desired level which is important for delay sensitive traffic.

Mitigation of negative impacts of Fast Congestion Control (FCC) on interference congestion (IC).

Enhanced flexibility, such as being able to scale the DPCCH or not, and if so by what extent to scale and for what reason (e.g., according to Quality of Service).

Although the description above contains many specificities, these should not be construed as limiting the scope of the technology disclosed herein but as merely providing illustrations of some of the presently preferred embodiments of the technology disclosed herein. Thus the scope of the technology disclosed herein should be determined by the appended claims and their legal equivalents. Therefore, it will be appreciated that the scope of the technology disclosed herein fully encompasses other embodiments which may become obvious to those skilled in the art, and that the scope of the technology disclosed herein is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the technology disclosed herein, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. A wireless terminal comprising:
a communications interface configured to communicate over a radio interface with a base station;
a congestion controller configured, upon occurrence of a congestion indication, to reduce uplink transmission power of the wireless terminal by performing an expedited transport format combination reduction procedure which comprises lowering a transport format combination for use by the wireless terminal for transmitting an enhanced dedicated uplink channel (E-DCH) over the radio interface to the base station;
wherein:
the expedited transport format combination reduction procedure is distinct from Dedicated Physical Control Channel (DPCCH) power reduction based on a command received in a closed loop power procedure; and
the occurrence of the congestion indication comprises receiving a transmit power control (TPC) DOWN command at approximately the same time as a retransmission rate of the E-DCH exceeds a predetermined threshold.

2. The wireless terminal of claim 1, wherein the congestion controller is configured to make a determination of an end of the congestion that prompted the congestion indication and to relax demand to lower the transport format combination upon the determination, the determination being made by at least one of:
receipt of an end-of-congestion signal from the base station node;
expiration of a specified congestion time duration, the specified congestion time duration being either preconfigured at the congestion controller or signaled by the base station node.

3. The wireless terminal of claim 1, wherein the congestion indication comprises either (1) a predetermined number of transmit power control (TPC) DOWN commands received in a given time period or (2) a predetermined pattern of transmit power control (TPC) DOWN commands.

4. The wireless terminal of claim 1, wherein the congestion controller is configured to lower a previous transport format combination by a specified number of steps to obtain an updated transport format combination for transmitting the enhanced dedicated uplink channel (E-DCH) over the radio interface to the base station, and wherein the specified number of steps is preconfigured or signaled to the wireless terminal by the network.

5. The wireless terminal of claim 1, wherein the congestion controller is configured to determine an updated transport format combination in accordance with a specified maximum allowed uplink transmission power by selecting an updated transport format combination which maximizes E-DCH power and also fulfills a condition that total required power for the uplink is lower than a specified maximum allowed uplink transmission power.

6. The wireless terminal of claim 5, wherein the congestion controller is configured to determine the specified maximum allowed uplink transmission power by subtracting a power decrease value from an old uplink transmission power limit.

7. The wireless terminal of claim 1, wherein the congestion controller is configured to determine an updated transport format combination by:
subtracting a requested uplink transmission power reduction value from a power value afforded a previous transport format combination to obtain a power limit for a new transport format combination;
using the new power limit to determine the new transport format combination.

8. A method of operating a wireless terminal comprising:
obtaining a congestion indication over a radio interface with a base station;
in response to the congestion indication, reducing uplink transmission power of the wireless terminal by performing an expedited transport format combination reduction procedure comprising lowering a transport format combination for use by the wireless terminal for transmitting an enhanced dedicated uplink channel (E-DCH) over the radio interface to the base station;
wherein:
the expedited transport format combination reduction procedure is distinct from Dedicated Physical Control Channel (DPCCH) power reduction based on a command received in a closed loop power procedure; and
obtaining the congestion indication comprises receiving a transmit power control (TPC) DOWN command at approximately the same time as a retransmission rate of the E-DCH exceeds a predetermined threshold.

9. The method of claim 8, further comprising:
determining an end of the congestion that prompted the congestion indication by at least one of:
receipt of an end-of-congestion signal from the base station node;
expiration of a specified congestion time duration, the specified congestion time duration being either preconfigured at the congestion controller or signaled by the base station node; and
relaxing a demand to lower the transport format combination.

10. The method of claim 8, wherein the congestion indication comprises either (1) a predetermined number of transmit power control (TPC) DOWN commands received in a given time period or (2) a predetermined pattern of transmit power control (TPC) DOWN commands.

11. The method of claim 8, further comprising lowering a previous transport format combination by a specified number of steps to obtain an updated transport format combination for transmitting the enhanced dedicated uplink channel (E-DCH) over the radio interface to the base station, and wherein the specified number of steps is preconfigured or signaled to the wireless terminal by the network.

12. The method of claim 8, further comprising determining an updated transport format combination by selecting an updated transport format combination which maximizes E-DCH power and also fulfills a condition that total required power for the uplink is lower than a specified maximum allowed uplink transmission power.

13. The method of claim 12, further comprising determining the specified maximum allowed uplink transmission power by subtracting a power decrease value from an old uplink transmission power limit.

14. The method of claim 13, further comprising determining the power decrease value by accumulating plural total power control commands over a transport format combination selection interval.

15. The method of claim 13, further comprising receiving the power decrease value in a signal from the base station.

16. The method of claim 8, further comprising determining an updated transport format combination by:
   subtracting a requested uplink transmission power reduction value from a power value afforded a previous transport format combination to obtain a power limit for a new transport format combination;
   using the new power limit to determine the new transport format combination.

* * * * *

UNITED STATES PATENT AND TRADEMARK OFFICE
CERTIFICATE OF CORRECTION

| | | |
|---|---|---|
| PATENT NO. | : 9,264,935 B2 | Page 1 of 1 |
| APPLICATION NO. | : 13/615216 | |
| DATED | : February 16, 2016 | |
| INVENTOR(S) | : Gu et al. | |

It is certified that error appears in the above-identified patent and that said Letters Patent is hereby corrected as shown below:

On the Title Page, in Item (54), in Title, in Column 1, Line 2, delete "APARATUS" and insert -- APPARATUS --, therefor.

Specification

In Column 1, Line 2, delete "APARATUS" and insert -- APPARATUS --, therefor.

In Column 11, Line 53, delete "terminal 20" and insert -- terminal 30 --, therefor.

In Column 12, Line 44, delete "40-1)." and insert -- 44-1). --, therefor.

In Column 12, Line 48, delete "dual dual" and insert -- dual --, therefor.

In Column 18, Line 34, delete "decrease from" and insert -- from --, therefor.

In Column 18, Line 35, delete "decrease may" and insert -- may --, therefor.

In Column 19, Line 22, delete "jth" and insert -- $j^{th}$ --, therefor.

In Column 19, Line 26, delete "to the this" and insert -- to this --, therefor.

In Column 21, Line 61, delete "10-2-2." and insert -- 10-4-2-2. --, therefor.

Signed and Sealed this
Twenty-sixth Day of July, 2016

Michelle K. Lee
*Director of the United States Patent and Trademark Office*